United States Patent
Liu

(10) Patent No.: US 10,841,050 B2
(45) Date of Patent: Nov. 17, 2020

(54) SIGNAL SENDING APPARATUS, SIGNAL RECEIVING APPARATUS, AND METHODS

(71) Applicant: HUAWEI TECHNOLOGIES CO., LTD., Guangdong (CN)

(72) Inventor: Kunpeng Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/272,847

(22) Filed: Feb. 11, 2019

(65) Prior Publication Data

US 2019/0173632 A1 Jun. 6, 2019

Related U.S. Application Data

(63) Continuation of application No. PCT/CN2017/097265, filed on Aug. 11, 2017.

(30) Foreign Application Priority Data

Aug. 12, 2016 (CN) .......................... 2016 1 0669793
Oct. 13, 2016 (CN) .......................... 2016 1 0894800

(51) Int. Cl.
| | |
|---|---|
| H04L 5/00 | (2006.01) |
| H04L 27/26 | (2006.01) |
| H04B 7/0408 | (2017.01) |
| H04W 56/00 | (2009.01) |

(52) U.S. Cl.
CPC .......... H04L 5/0007 (2013.01); H04L 5/0048 (2013.01); H04L 5/0083 (2013.01);
(Continued)

(58) Field of Classification Search
CPC ... H04L 5/0007; H04L 5/0048; H04L 5/0083; H04L 27/2605; H04L 27/2613; H04L 27/2656
See application file for complete search history.

(56) References Cited

U.S. PATENT DOCUMENTS

2006/0250937 A1* 11/2006 Wang .................. H04J 11/00
2007/0149128 A1* 6/2007 Das ..................... H04B 17/00
(Continued)

FOREIGN PATENT DOCUMENTS

| CN | 103220119 A | 7/2013 |
|---|---|---|
| CN | 105101387 A | 11/2015 |

(Continued)

OTHER PUBLICATIONS

3GPP TS 36.213 V13.2.0 (Jun. 2016),3rd Generation Partnership Project;Technical Specification Group Radio Access Network;Evolved Universal Terrestrial Radio Access (E-UTRA);Physical layer procedures(Release 13),dated Jun. 2016,total 381 pages.
(Continued)

Primary Examiner — Ronald B Abelson
(74) Attorney, Agent, or Firm — James Anderson Harrison

(57) ABSTRACT

This application relates to the communications field, and discloses a signal sending method. The method includes: sending, by a first network device, X first signal(s) and Y second signal(s), where each second signal is associated with at least one first signal, X is an integer greater than or equal to 1, and Y is an integer greater than or equal to 1, where the first signal carries OFDM-symbol index information, the OFDM-symbol index information indicates an index of an OFDM symbol in which the first signal is located in a first time unit, the second signal carries first-time-unit index information, and the first-time-unit index information indicates an index of a first time unit in which the second signal is located in a second time unit, that is, a position of the OFDM symbol in which the first signal is located in the second time unit can be located by using a combination of one second signal and one associated first signal.

19 Claims, 7 Drawing Sheets

(52) U.S. Cl.
CPC ...... *H04L 27/2605* (2013.01); *H04L 27/2613* (2013.01); *H04L 27/2656* (2013.01); *H04B 7/0408* (2013.01); *H04L 27/2692* (2013.01); *H04W 56/00* (2013.01)

(56) References Cited

U.S. PATENT DOCUMENTS

| | | |
|---|---|---|
| 2010/0260112 A1 | 10/2010 | Ramesh et al. |
| 2011/0269492 A1 | 11/2011 | Wang et al. |
| 2016/0308637 A1 | 10/2016 | Frenne et al. |
| 2017/0064660 A1 | 3/2017 | Chen et al. |

FOREIGN PATENT DOCUMENTS

| | | |
|---|---|---|
| CN | 105263188 A | 1/2016 |
| CN | 105637964 A | 6/2016 |
| CN | 105723639 A | 6/2016 |
| WO | 2015080646 A1 | 6/2015 |
| WO | 2015080649 A1 | 6/2015 |

OTHER PUBLICATIONS

Qualcomm Incorporated,"Numerology and TTI multiplexing for NR Forward Compatibility Analysis ",3GPP TSG-RAN WG1 #85 R1-164692,23rd May 27, 2016,total 8 pages.

Huawei et al.,"NR Primary and Secondary Synchronization Signals Design",3GPP TSG RAN WG1 Meeting #87 R1-1611261,Reno, USA, Nov. 14-18, 2016 ,total 10 pages.

Qualcomm Incorporated,"Conveying symbol index during multi-beam Sync",3GPP TSG RAN WG1 Meeting #87 R1-1612034,Reno, Nevada, USA, Nov. 14-18, 2016,total 3 pages.

* cited by examiner

SIGNAL SENDING APPARATUS, SIGNAL RECEIVING APPARATUS, AND METHODS

CROSS-REFERENCE TO RELATED APPLICATIONS

This application is a continuation of International Application No. PCT/CN2017/097265, filed on Aug. 11, 2017, which claims priority to Chinese Patent Application No. 201610669793.5, filed on Aug. 12, 2016, and Chinese Patent Application No. 201610894800.1, filed on Oct. 13, 2016, The disclosures of the aforementioned applications are hereby incorporated by reference in their entireties.

TECHNICAL FIELD

This application relates to the communications field, and in particular, to a signal sending apparatus, a signal receiving apparatus, and methods.

BACKGROUND

In the Long Term Evolution (LTE) technology, when searching for a cell, user equipment (UE) needs to perform frame synchronization with an evolved Node B (eNB) corresponding to the cell.

In LTE using time division duplexing (TDD) or frequency division duplexing (FDD), UE first correlates a pre-stored primary synchronization sequence with a radio frame ( ) sent by an eNB, and determines a position of a primary synchronization channel (PSCH) in the radio frame based on a maximum correlation peak. After determining the position of the PSCH, the UE further determines a position of the SSCH in the radio frame based on a position relationship between the PSCH and a secondary synchronization channel (Secondary Synchronization Channel, SSCH), to determine a frame boundary of the radio frame based on the position of the SSCH and complete frame synchronization.

Because only one beam is used to transmit a radio frame in LTE, UE can complete frame synchronization by using one pair of synchronization signals. In the fifth-generation mobile communications technology (5G), each radio frame is transmitted by using different beams at different moments. A position of a synchronization signal in a radio frame varies on different beams. Consequently, frame synchronization of radio frames cannot be implemented by using the foregoing frame synchronization mechanism.

SUMMARY

To resolve a problem that frame synchronization of radio frames cannot be implemented by using an existing synchronization mechanism because a position of a synchronization signal in a radio frame varies on different beams, embodiments of this application provide a signal sending apparatus, a signal receiving apparatus, and methods. The technical solutions are as follows:

According to a first aspect, a signal sending method is provided, where the method includes:

sending, by a first network device, X first signal(s) and Y second signal(s), where each second signal is associated with at least one first signal, X is an integer greater than or equal to 1, and Y is an integer greater than or equal to 1, where the first signal carries orthogonal frequency division multiplexing OFDM-symbol index information, the OFDM-symbol index information indicates an index of an OFDM symbol in which the first signal is located in a first time unit, the second signal carries first-time-unit index information, the first-time-unit index information indicates an index of a first time unit in which the second signal is located in a second time unit, one second time unit includes at least two first time units, and each first time unit includes at least two OFDM symbols.

In the solution shown in the first aspect, when sending signals, the first network device sends the X first signal(s) and the Y second signal(s), where each second signal is associated with at least one first signal, where the OFDM-symbol index information carried in the first signal indicates an index of an OFDM symbol in which the first signal is located in a first time unit, and the first-time-unit index information carried in the second signal indicates an index of a first time unit in which the second signal is located in a second time unit, that is, a position of the OFDM symbol in which the first signal is located in the second time unit can be located by using a combination of one second signal and one associated first signal.

One second time unit includes at least two first time units, each first time unit includes at least two OFDM symbols, a second network device detects one of the X first signal(s) and one of the Y second signal(s) that are sent by the first network device, obtains the OFDM-symbol index information based on the first signal, and obtains the first-time-unit index information based on the second signal, to determine a position of the first signal in the second time unit, thereby implementing frame timing.

Optionally, among the X first signal(s) and the Y second signal(s), one first signal and one second signal that are associated with each other are located on a single transmit beam.

Optionally, among the X first signal(s) and the Y second signal(s), one first signal and one second signal that are associated with each other are located in a single first time unit.

Optionally, for a cell or a super cell, the first signal is a synchronization signal, and the second signal is a broadcast signal; or the first signal is a broadcast signal, and the second signal is a synchronization signal; or the first signal is a synchronization signal, and the second signal is a synchronization signal.

Optionally, the synchronization signal includes a primary synchronization signal and a secondary synchronization signal; or the synchronization signal includes a primary synchronization signal, a secondary synchronization signal, and a third synchronization signal eSSS; and the primary synchronization signal and the secondary synchronization signal included in each synchronization signal are located in a single first time unit.

Optionally, the first time unit is a subframe or a timeslot.

Optionally, for a cell or a super cell, the first signal is a synchronization signal, and the index of the OFDM symbol in which the first signal is located in the first time unit is indicated by different sequences of the synchronization signal.

Optionally, for a cell or super cell, in a first time unit for transmitting a synchronization signal, sequences of primary synchronization signals in synchronization signals transmitted in different OFDM symbols are used to indicate indexes of corresponding OFDM symbols in the first time unit;

in different first time units for transmitting a synchronization signal, sequences of primary synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Optionally, for a cell or super cell, in a first time unit for transmitting a synchronization signal, sequences of secondary synchronization signals in synchronization signals transmitted in different OFDM symbols are used to indicate indexes of corresponding OFDM symbols in the first time unit;

in different first time units that are used for transmitting a synchronization signal and that are in a same half-frame, sequences of secondary synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Optionally, a cell for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same, and sequences of secondary synchronization signals in synchronization signals transmitted in different OFDM symbols are the same;

in different first time units for transmitting a synchronization signal, sequences of primary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Optionally, for a cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Optionally, for a cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Optionally, for a cell or super cell, in a first time unit for transmitting a synchronization signal, sequences of primary synchronization signals in synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit; and in different first time units for transmitting a synchronization signal, sequences of primary synchronization signals in OFDM symbols corresponding to a same OFDM symbol index are the same.

Optionally, for a cell or super cell, in a first time unit for transmitting a synchronization signal, sequences of secondary synchronization signals in synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit; and in different first time units that are used for transmitting a synchronization signal and that are in a same half-frame, sequences of secondary synchronization signals in OFDM symbols corresponding to a same OFDM symbol index are the same.

Optionally, for a cell or super cell, a sequence of the primary synchronization signal in the synchronization signal is used to identify cell ID information in one cell ID group; and a sequence of the secondary synchronization signal in the synchronization signal is used to identify information of a cell ID group.

Optionally, for a cell or super cell, when the first signal is a synchronization signal and the second signal is a broadcast signal, signaling of the broadcast signal explicitly indicates first-time-unit index information of the broadcast signal; and/or scrambling code in the broadcast signal carries the first-time-unit index information; and/or a mask of cyclic redundancy check code CRC in the broadcast signal carries the first-time-unit index information.

Optionally, for a cell or super cell, when the first signal is a synchronization signal and the second signal is a broadcast signal, signaling of the broadcast signal explicitly indicates first-time-unit index information of the broadcast signal; and scrambling code in the broadcast signal carries OFDM-symbol index information corresponding to the broadcast signal or OFDM-symbol index information of a synchronization signal corresponding to the broadcast signal.

Optionally, for a cell or super cell, when the first signal is a synchronization signal and the second signal is a broadcast signal, signaling of the broadcast signal explicitly indicates first-time-unit index information of the broadcast signal; and a mask of CRC in the broadcast signal carries OFDM-symbol index information corresponding to the broadcast signal or OFDM-symbol index information of a synchronization signal corresponding to the broadcast signal.

Optionally, for a cell or super cell, a maximum quantity of indexes of the first time unit is less than or equal to a quantity of first time units in one second time unit.

Optionally, for a cell or super cell, a position of a first time unit for sending the first signal by the first network device in one second time unit is changeable.

Optionally, for a cell or super cell, a position of a first time unit for sending the second signal by the first network device in one second time unit is changeable.

Optionally, for a cell or super cell, a quantity of first time units occupied by the first network device to send the first signal in one second time unit is changeable.

Optionally, for a cell or super cell, a quantity of first time units occupied by the first network device to send the second signal in one second time unit is changeable.

Optionally, for a cell or super cell, a time-frequency resource corresponding to the first signal is associated with a time-frequency resource corresponding to the second signal.

Optionally, for a cell or super cell, a time-frequency resource corresponding to the first signal and a time-frequency resource corresponding to the second signal are frequency division multiplexed in a same OFDM symbol; or a time-frequency resource corresponding to the first signal and a time-frequency resource corresponding to the second signal are time division multiplexed in different OFDM symbols.

According to a second aspect, a signal receiving method is provided, where the method includes:

detecting, by a second network device, one of X first signal(s) and one of Y second signal(s) that are sent by a first network device, where X is an integer greater than or equal to 1, and Y is an integer greater than or equal to 1; and obtaining, by the second network device, OFDM-symbol index information based on the first signal, and obtaining first-time-unit index information based on the second signal, where the OFDM-symbol index information indicates an index of an OFDM symbol in which the first signal is located in a first time unit, the first-time-unit index information indicates an index of a first time unit in which the second signal is located in a second time unit, one second time unit includes at least two first time units, and each first time unit includes at least two OFDM symbols.

Optionally, among the X first signal(s) and the Y second signal(s), one first signal and one second signal that are associated with each other are located on a single transmit beam.

Optionally, among the X first signal(s) and the Y second signal(s), one first signal and one second signal that are associated with each other are located in a single first time unit.

Optionally, for a cell or super cell, the first signal is a synchronization signal, and the second signal is a broadcast signal; or the first signal is a broadcast signal, and the second signal is a synchronization signal; or the first signal is a synchronization signal, and the second signal is a synchronization signal.

Optionally, the synchronization signal includes a primary synchronization signal and a secondary synchronization signal; or the synchronization signal includes a primary synchronization signal, a secondary synchronization signal, and a third synchronization signal eSSS; and the primary synchronization signal and the secondary synchronization signal included in each synchronization signal are located in a single first time unit.

Optionally, the first time unit is a subframe or a timeslot.

Optionally, for a cell or super cell, the first signal is a synchronization signal, and the index of the OFDM symbol in which the first signal is located in the first time unit is indicated by different sequences of the synchronization signal.

Optionally, for a cell or super cell, in a first time unit for transmitting a synchronization signal, sequences of primary synchronization signals in synchronization signals transmitted in different OFDM symbols are used to indicate indexes of corresponding OFDM symbols in the first time unit;

in different first time units for transmitting a synchronization signal, sequences of primary synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Optionally, for a cell or super cell, in a first time unit for transmitting a synchronization signal, sequences of secondary synchronization signals in synchronization signals transmitted in different OFDM symbols are used to indicate indexes of corresponding OFDM symbols in the first time unit;

in different first time units that are used for transmitting a synchronization signal and that are in a same half-frame, sequences of secondary synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Optionally, for a cell or super cell, in a first time unit for transmitting a synchronization signal, sequences of third synchronization signals eSSS of synchronization signals transmitted in different OFDM symbols are used to indicate indexes of corresponding OFDM symbols in the first time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same, and sequences of secondary synchronization signals in synchronization signals transmitted in different OFDM symbols are the same;

in different first time units for transmitting a synchronization signal, sequences of primary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Optionally, for a cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Optionally, for a cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Optionally, for a cell or super cell, in a first time unit for transmitting a synchronization signal, sequences of primary synchronization signals in synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit; and in different first time units for transmitting a synchronization signal, sequences of primary synchronization signals in OFDM symbols corresponding to a same OFDM symbol index are the same.

Optionally, for a cell or super cell, in a first time unit for transmitting a synchronization signal, sequences of secondary synchronization signals in synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit; and in different first time units that are used for transmitting a synchronization signal and that are in a same half-frame, sequences of secondary synchronization signals in OFDM symbols corresponding to a same OFDM symbol index are the same.

Optionally, for a cell or super cell, a sequence of the primary synchronization signal in the synchronization signal is used to identify cell ID information in one cell ID group; and a sequence of the secondary synchronization signal in the synchronization signal is used to identify information of a cell ID group.

Optionally, for a cell or super cell, when the first signal is a synchronization signal and the second signal is a broadcast signal, signaling of the broadcast signal explicitly indicates first-time-unit index information of the broadcast signal; and/or scrambling code in the broadcast signal carries the first-time-unit index information; and/or a mask of cyclic redundancy check code CRC in the broadcast signal carries the first-time-unit index information.

Optionally, for a cell or super cell, when the first signal is a synchronization signal and the second signal is a broadcast signal, signaling of the broadcast signal explicitly indicates first-time-unit index information of the broadcast signal; and scrambling code in the broadcast signal carries OFDM-symbol index information corresponding to the broadcast signal or OFDM-symbol index information of a synchronization signal corresponding to the broadcast signal.

Optionally, for a cell or super cell, when the first signal is a synchronization signal and the second signal is a broadcast signal, signaling of the broadcast signal explicitly indicates first-time-unit index information of the broadcast signal; and a mask of CRC in the broadcast signal carries OFDM-symbol index information corresponding to the broadcast signal or OFDM-symbol index information of a synchronization signal corresponding to the broadcast signal.

Optionally, for a cell or super cell, a maximum quantity of indexes of the first time unit is less than or equal to a quantity of first time units in one second time unit.

Optionally, for a cell or super cell, a position of a first time unit for sending the first signal by the first network device in one second time unit is changeable.

Optionally, for a cell or super cell, a position of a first time unit for sending the second signal by the first network device in one second time unit is changeable.

Optionally, for a cell or super cell, a quantity of first time units occupied by the first network device to send the first signal in one second time unit is changeable.

Optionally, for a cell or super cell, a quantity of first time units occupied by the first network device to send the second signal in one second time unit is changeable.

Optionally, for a cell or super cell, a time-frequency resource corresponding to the first signal is associated with a time-frequency resource corresponding to the second signal.

Optionally, for a cell or super cell, a time-frequency resource corresponding to the first signal and a time-frequency resource corresponding to the second signal are frequency division multiplexed in a same OFDM symbol; or a time-frequency resource corresponding to the first signal and a time-frequency resource corresponding to the second signal are time division multiplexed in different OFDM symbols.

According to a third aspect, an embodiment of this application provides a signal sending apparatus, where the signal sending apparatus includes at least one unit, and the at least one unit is configured to implement the signal sending method provided in the foregoing first aspect or the various optional implementations of the first aspect.

According to a fourth aspect, an embodiment of this application provides a signal detection apparatus, where the signal detection apparatus includes at least one unit, and the at least one unit is configured to implement the signal receiving method provided in the foregoing second aspect or the various optional implementations of the second aspect.

According to a fifth aspect, an embodiment of this application provides a network device, where the network device includes a processor and a memory, the memory stores at least one instruction, at least one program, a code set or an instruction set, and the processor implements, by executing the at least one instruction, the at least one program, the code set or the instruction set, the signal sending method provided in the foregoing first aspect or the various optional implementations of the first aspect.

According to a sixth aspect, an embodiment of this application provides a network device, where the network device includes a processor and a memory, the memory stores at least one instruction, at least one program, a code set or an instruction set, and the processor implements, by executing the at least one instruction, the at least one program, the code set or the instruction set, the signal receiving method provided in the foregoing second aspect or the various optional implementations of the second aspect.

According to a seventh aspect, an embodiment of this application further provides a computer readable storage medium, where the computer readable storage medium stores at least one instruction, at least one program, a code set or an instruction set, the at least one instruction, the at least one program, the code set or the instruction set may be executed by a processor of a network device, to implement an instruction of the signal sending method provided in the foregoing first aspect or various optional implementations of the first aspect, or, the at least one instruction, the at least one program, the code set or the instruction set may be executed by a processor of a network device, to implement an instruction of the signal receiving method provided in the second aspect or the various optional implementations of the second aspect.

DESCRIPTION OF EMBODIMENTS

To make the objectives, technical solutions, and advantages of this application clearer, the following further describes implementations of this application in detail with reference to the accompanying drawings.

It should be understood that "several" mentioned in this specification means one or more, and "a plurality of" means two or more. The term "and/or" describes an association relationship for describing associated objects and indicates that three relationships may exist. For example, A and/or B may indicate the following three cases: Only A exists, both A and B exist, and only B exists. The character "/" generally indicates an "or" relationship between the associated objects.

Figure 1:
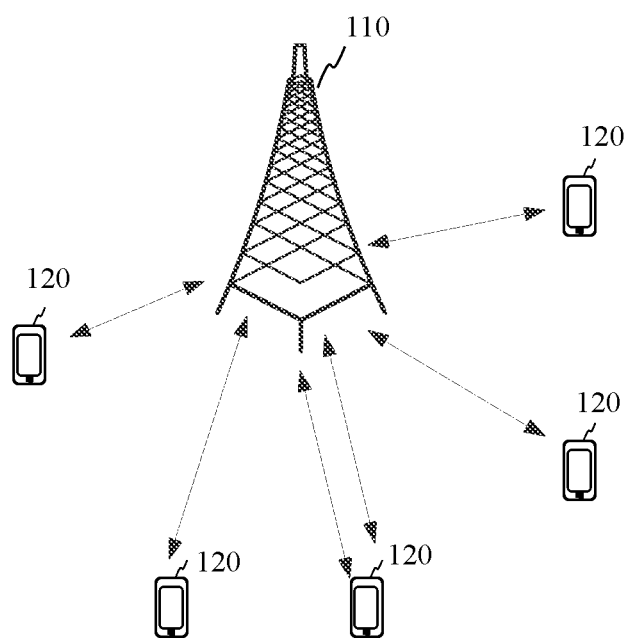
FIG. 1 is an architectural diagram of a network environment used in this application.

FIG. 1 is an architectural diagram of a network environment used in this application. The network environment includes the following network devices: a first network device 110 and a second network device 120.

The first network device 110 and the second network device 120 are located in a same wireless system. For example, the first network device 110 may be a wireless access device, and the second network device 120 may be a terminal (as shown in FIG. 1). Alternatively, opposite to the case shown in FIG. 1, the first network device 110 may be a terminal, and the second network device 120 may be a wireless access device.

The wireless access device may be an independent base station, for example, a macrocell, a microcell or a picocell. Alternatively, the wireless access device may be distributed base stations that form a cloud radio access network. Alternatively, the wireless access device may be a wireless router.

The terminal may include various handheld devices, in-vehicle devices, Internet of Things devices, wearable devices, and computing devices having a wireless communications function or other processing devices connected to a wireless modem, and various forms of user equipments (English: User Equipment, UE for short), mobile stations (English: Mobile station, MS for short), terminals (terminal), terminal equipments (Terminal Equipment), software terminals, and the like. For ease of description, in this application, the devices mentioned above are generally referred to as terminals or UEs.

In the solution shown in this application, the first network device 110 may send signals on a plurality of different beams.

Figure 2:
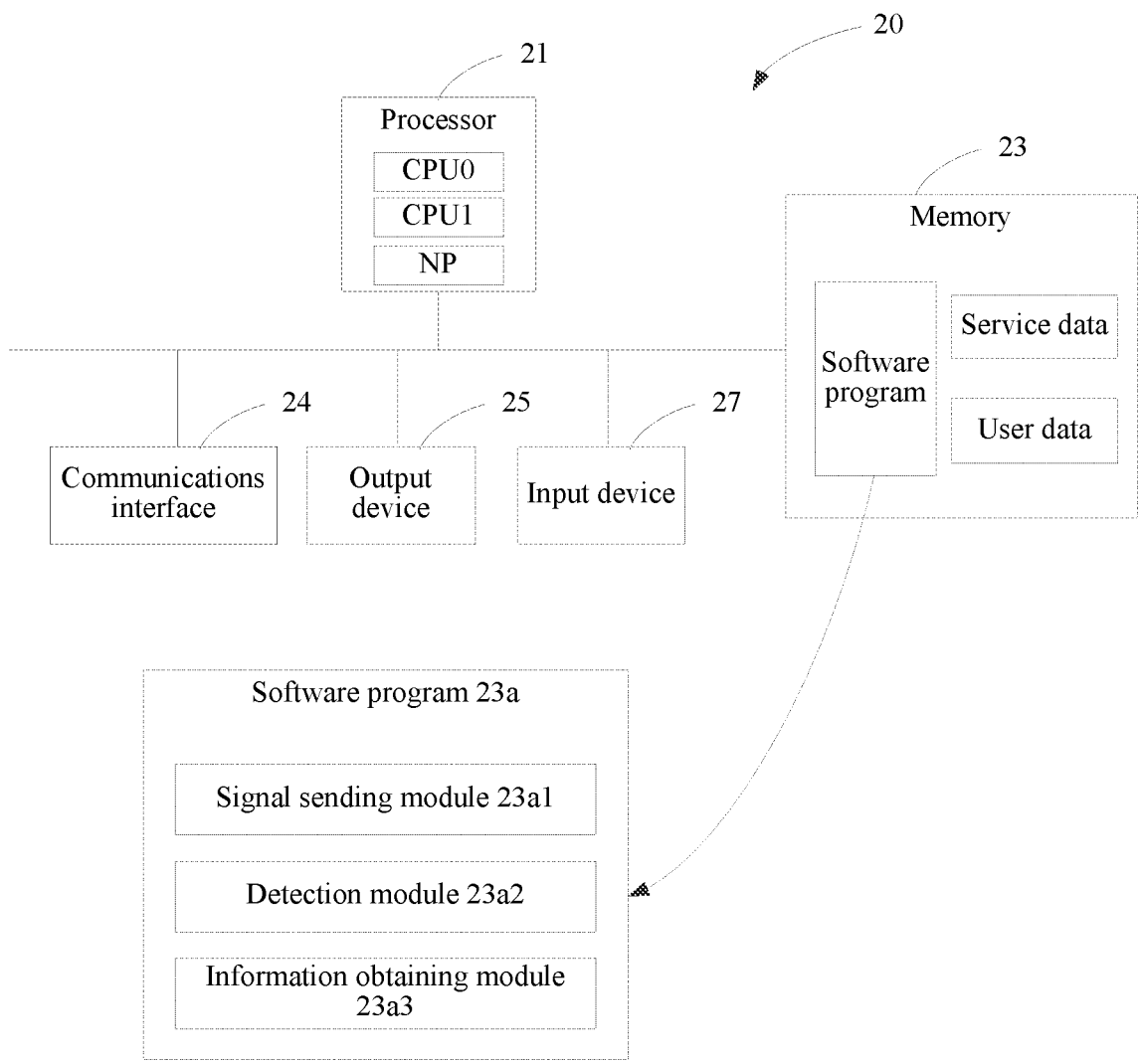
FIG. 2 is a schematic structural diagram of a network device according to an embodiment of this application.

FIG. 2 is a schematic structural diagram of a network device 20 according to an embodiment of this application. The network device 20 may be implemented as the first network device 110 or the second network device 120 in the network environment shown in FIG. 1. As shown in FIG. 2, the network device 20 may include a processor 21 and a communications interface 24.

The processor 21 may include one or more processing units. The processing unit may be a central processing unit (English: central processing unit, CPU), a network processor (English: network processor, NP), or the like.

The communications interface 24 may include a wired network interface, for example, an Ethernet interface or an optical fiber interface, or may include a wireless network interface, for example, a cellular network interface. For example, when the network device is a wireless access device, the communications interface 24 may include both a wired network interface and a wireless network interface. The wired network interface may be configured to connect the network device 20 and an upper-layer network device in a wireless system. The wireless network interface may be configured to communicate with a terminal within signal coverage. Alternatively, when the network device is a terminal, the communications interface 24 may include only a wireless network interface configured to communicate with the wireless access device or another terminal.

Optionally, the network device 20 may further include a memory 23. The processor 21 may be connected to the memory 23 and the communications interface 24 by using the bus.

The memory 23 stores at least one instruction, at least one program, a code set or an instruction set. The at least one instruction, the at least one program, the code set or the instruction set is loaded and executed by the processor 21 to implement steps that are performed by the first network device and that are related to signal sending in subsequent embodiments of this application; or, the at least one instruction, the at least one program, the code set or the instruction set is loaded and executed by the processor 21 to implement steps that are performed by the second network device and that are related to signal receiving in subsequent embodiments.

For example, in FIG. 2, the memory 23 may be configured to store a software program 23a. The software program 23a may be executed by the processor 21. In addition, the memory 23 may further store various types of service data or user data.

Optionally, as shown in FIG. 2, when the network device 20 is implemented as the first network device 110 in the network environment shown in FIG. 1, the software program 23a may include a signal sending module 23a1.

The signal sending module 23a1 is configured to send X first signal(s) and Y second signal(s), where each second signal is associated with at least one first signal, X is an integer greater than or equal to 1, and Y is an integer greater than or equal to 1.

Optionally, as shown in FIG. 2, when the network device 20 is implemented as the second network device 120 in the network environment shown in FIG. 1, the software program 23a may include a detection module 23a2 and an information obtaining module 23a3.

The detection module 23a2 is configured to detect one of the X first signal(s) and one of the Y second signal(s) that are sent by the first network device.

The information obtaining module 23a3 is configured to: obtain OFDM-symbol index information based on the first signal, and obtain first-time-unit index information based on the second signal, where the OFDM-symbol index information indicates an index of an OFDM symbol in which the first signal is located in a first time unit, the first-time-unit index information indicates an index of a first time unit in which the second signal is located in a second time unit, one second time unit includes at least two first time units, and each first time unit includes at least two OFDM symbols.

Optionally, the network device 20 may further include an output device 25 and an input device 27. The output device 25 and the input device 27 are connected to the processor 21. The output device 25 may be a display configured to display information, a power amplifier device for playing audio, a printer, or the like. The output device 25 may further include an output controller for providing an output to a screen of the display, the power amplifier device or the printer. The input device 27 may be a device such as a mouse, a keyboard, an electronic stylus or a touch panel used by a user to input information. The input device 27 may further include an output controller configured to receive and process an input from the device such as the mouse, the keyboard, the electronic stylus or the touch panel.

In addition, an embodiment of this application further provides a computer readable storage medium. The computer readable storage medium stores at least one instruction, at least one program, a code set or an instruction set. The at least one instruction, the at least one program, the code set or the instruction set may be executed by a processor of a network device to complete steps that are performed by a first network device and that are related to signal sending in subsequent embodiments of this application; or, the at least one instruction, the at least one program, the code set or the instruction set may be executed by a processor of a network device to complete steps that are performed by a second network device and that are related to signal receiving in subsequent embodiments of this application.

The computer readable storage medium may be a ROM, a random-access memory (RAM), a CD-ROM, a magnetic tape, a floppy disk, an optical data storage device, or the like.

Figure 3:
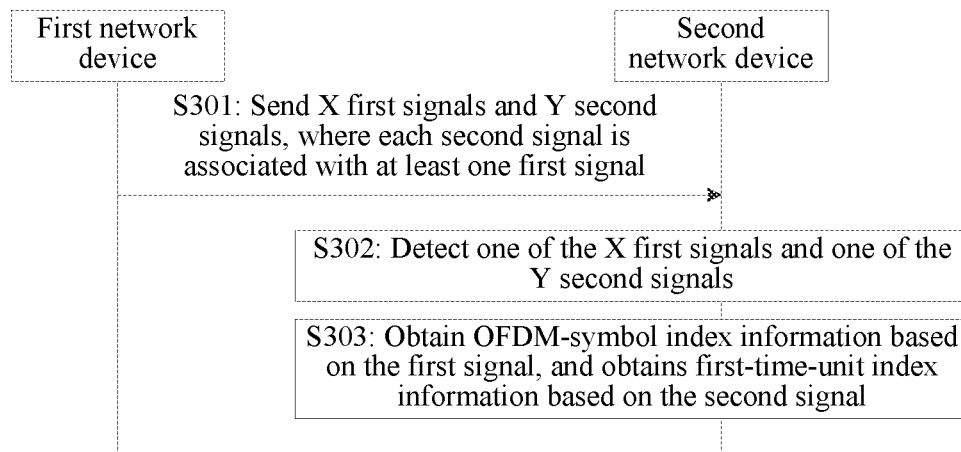
FIG. 3 is a flowchart of a signal sending method according to an embodiment of this application.

Referring to FIG. 3, FIG. 3 is a flowchart of a signal sending method according to an embodiment of this application. The method may be used in the first network device 110 in the network environment shown in FIG. 1. As shown in FIG. 3, the signal sending method may include the following steps.

Step 301: The first network device sends X first signal(s) and Y second signal(s), where each second signal is associated with at least one first signal, X is an integer greater than or equal to 1, and Y is an integer greater than or equal to 1.

In this embodiment of the present invention, a radio resource may be divided in a time domain based on second time units. Each second time unit includes at least two first time units. Each first time unit includes at least two OFDM symbols. For example, the second time unit may be one radio frame, or the second time unit may be less than one radio frame (for example, a half radio frame), or the second time unit may be greater than one radio frame (for example, two or more radio frames). In all subsequent content in this embodiment of the present invention, an example in which a second time unit is one radio frame is used for description.

For a cell or super cell, the first signal carries OFDM (Orthogonal Frequency Division Multiplexing, orthogonal frequency division multiplexing)-symbol index information, the OFDM-symbol index information indicates an index of an OFDM symbol in which the first signal is located in a first time unit, the second signal carries first-time-unit index information, the first-time-unit index information indicates an index of a first time unit in which the second signal is located in the radio frame, the radio frame includes at least two first time units, and each first time unit includes at least two OFDM symbols.

Among the X first signal(s) included in the radio frame, each first signal indicates an index of an OFDM symbol in which the first signal is located in a first time unit, that is, indicates which OFDM symbol in a first time unit is the OFDM symbol in which the first signal is located. Among the X second signal(s) included in the radio frame, each second signal indicates an index of a first time unit in which the second signal is located, that is, indicates a first time unit in which the second signal is located in the radio frame. Moreover, each second signal corresponds to at least one first signal. That is, a combination of one first signal and one second signal may indicate a specific position of the OFDM symbol carrying the first signal in the radio frame.

Figure 4:
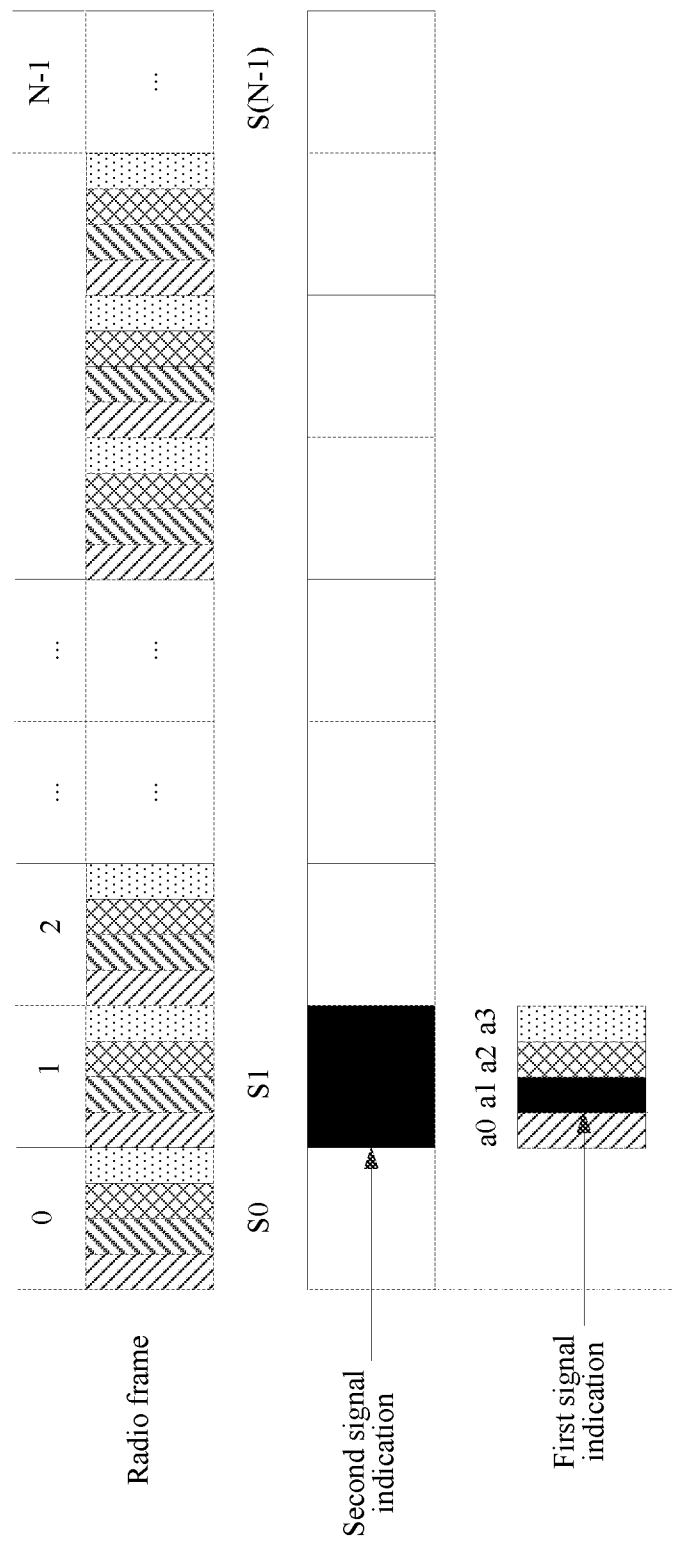
FIG. 4 is a schematic diagram of division based on a second time unit used in the embodiment shown in FIG. 3.

For example, referring to FIG. 4, FIG. 4 is a schematic diagram of division of a radio frame used in the disclosed embodiment. One radio frame includes N first time units. Each time unit includes at least two OFDM symbols (four OFDM symbols are shown in FIG. 4). Indexes of the N first time units in the radio frame are S0, S1, . . . , and S(N−1). Indexes in each first time unit are a0, a1, a2, and a3. In FIG. 4, an index that is indicated by OFDM-symbol index information carried in a first signal and that is of an OFDM symbol in a first time unit is a1. An index that is indicated by first-time-unit index information carried in a second signal associated with the first signal and that is of the first time unit in the radio frame is S1. In this way, a combination of the first signal and the second signal can indicate that the position of the OFDM symbol carrying the first signal in the radio frame is an OFDM symbol (that is, a second OFDM symbol) whose index is a1 in a first time unit (that is, a second first time unit) whose index is S1.

Optionally, for a cell or super cell, the first signal is a synchronization signal, and the second signal is a broadcast signal; or, the first signal is a broadcast signal, and the second signal is a synchronization signal; or, the first signal is a synchronization signal, and the second signal is a synchronization signal.

Optionally, among the X first signal(s) and the Y second signal(s), one first signal and one second signal that are associated with each other are located on a single transmit beam.

In this embodiment of this application, the first network device may send the X first signal(s) and the Y second signal(s) by using different beams, and one first signal and one second signal that are associated with each other are sent on a same beam.

For example, it is assumed that the first network device is a base station, and the base station supports 12 beams. 12 groups of first signal(s) and second signal(s) that are associated with each other may be preset in the base station. The 12 groups of first signal(s) and second signal(s) that are associated with each other correspond to positions of different OFDM symbols in the radio frame. When sending signals, the base station sends, on each beam, one group of first signal and second signal that are associated with each other.

Optionally, among the X first signal(s) and the Y second signal(s), one first signal and one second signal that are associated with each other are located in a single first time unit.

For example, FIG. 4 is used as an example. An index that is indicated by a first signal and that is of an OFDM symbol in a first wireless unit is a1, and an index that is indicated by a second signal associated with the first signal and that is of the first time unit is S1. In this case, the first signal is sent in the OFDM symbol whose index is a1 in the first time unit whose index is S1. The associated second signal may be sent in the same OFDM symbol whose index is a1, and may be sent in another OFDM symbol in the first time unit whose index is S1.

Optionally, the synchronization signal includes a primary synchronization signal and a secondary synchronization signal; or the synchronization signal includes a primary synchronization signal, a secondary synchronization signal, and a third synchronization signal eSSS; and the primary synchronization signal and the secondary synchronization signal included in each synchronization signal are located in a single first time unit.

Figure 5:
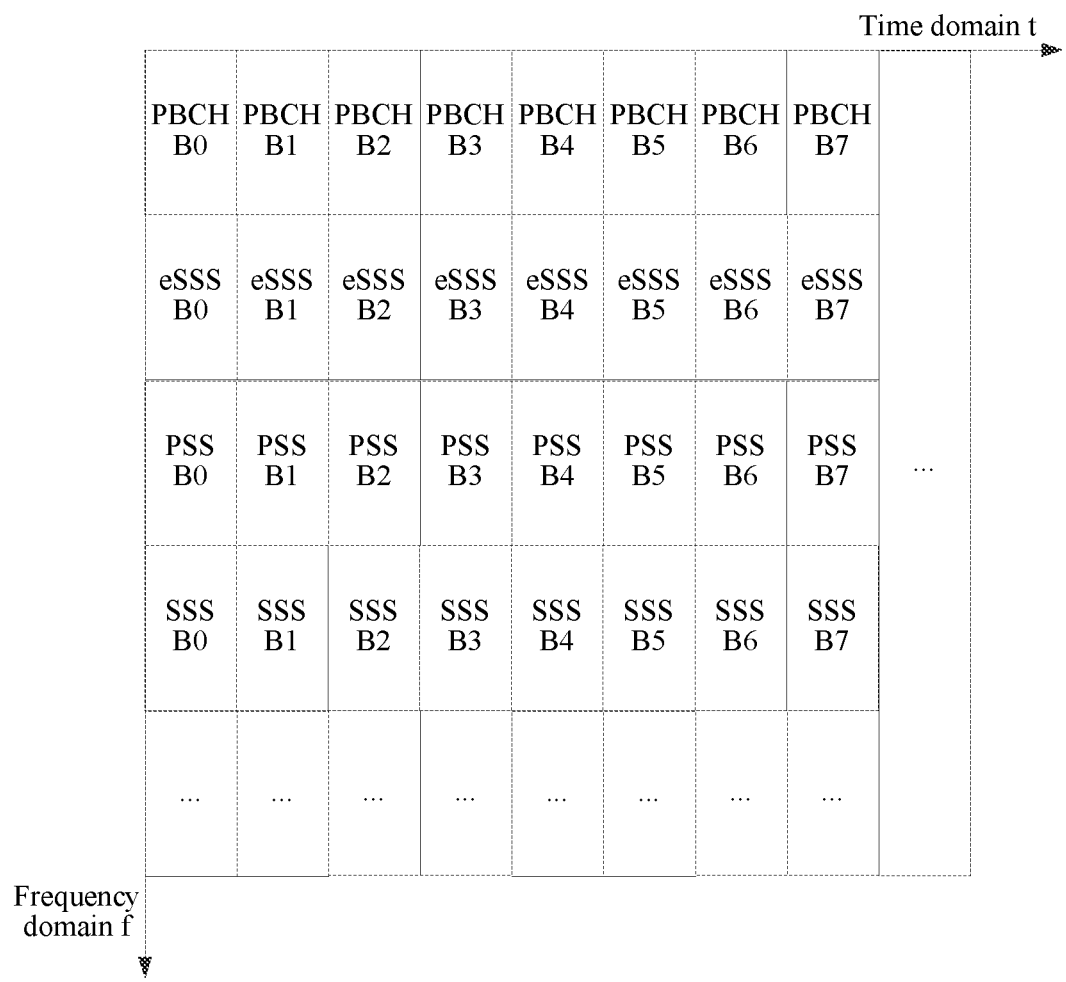
FIG. 5 is a schematic diagram of one type of resource mapping used in the embodiment shown in FIG. 3.

For example, referring to FIG. 5, FIG. 5 is a schematic diagram of one type of resource mapping used in the disclosed embodiment, and shows signals carried in some frequency bands in OFDM symbols in two first time units in a same cell or a super cell. Each first time unit includes four OFDM symbols (there are a total of eight OFDM symbols whose sequence numbers are 0 to 7). Different frequency bands in each OFDM symbol carry a PBCH (Physical broadcast channel, physical broadcast channel), a third synchronization signal eSSS, a PSS (Primary Synchronization Signal, primary synchronization signal), and an SSS (Secondary Synchronization Signal, secondary synchronization signal). A signal carried on the PBCH is a broadcast signal.

In FIG. 5, the first signal may be a synchronization signal (any one of an eSSS, a PSS, and an SSS) in each OFDM symbol, and the second signal may be a signal on a PBCH in each OFDM symbol. Alternatively, the first signal may be a signal on a PBCH in each OFDM symbol, and the second signal may be a synchronization signal (any one of an eSSS, a PSS, and an SSS) in each OFDM symbol. Alternatively, the first signal and the second signal may be any two of synchronization signals (an eSSS, a PSS, and an SSS).

Figure 6:
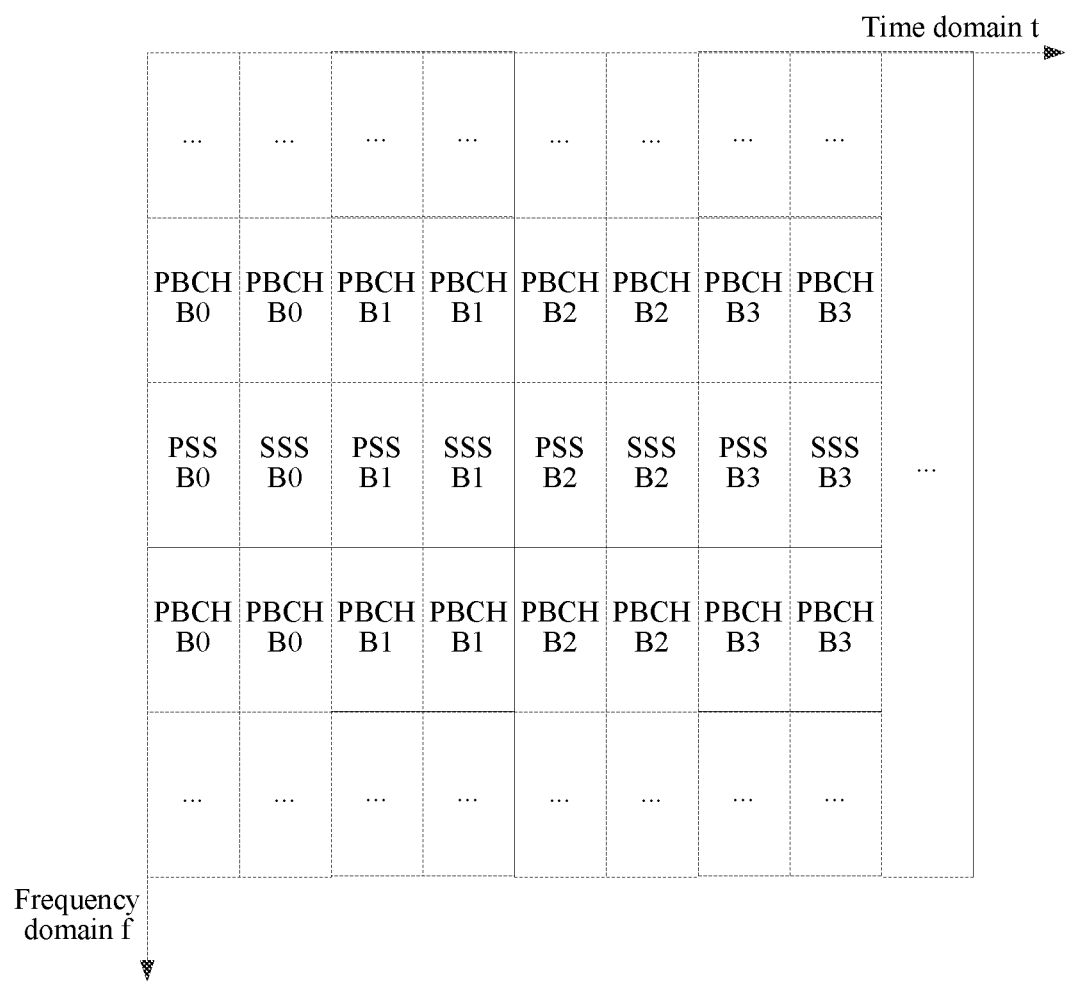
FIG. 6 to FIG. 8 are schematic diagrams of three types of resource mapping used in the embodiment shown in FIG. 3.
Figure 7:
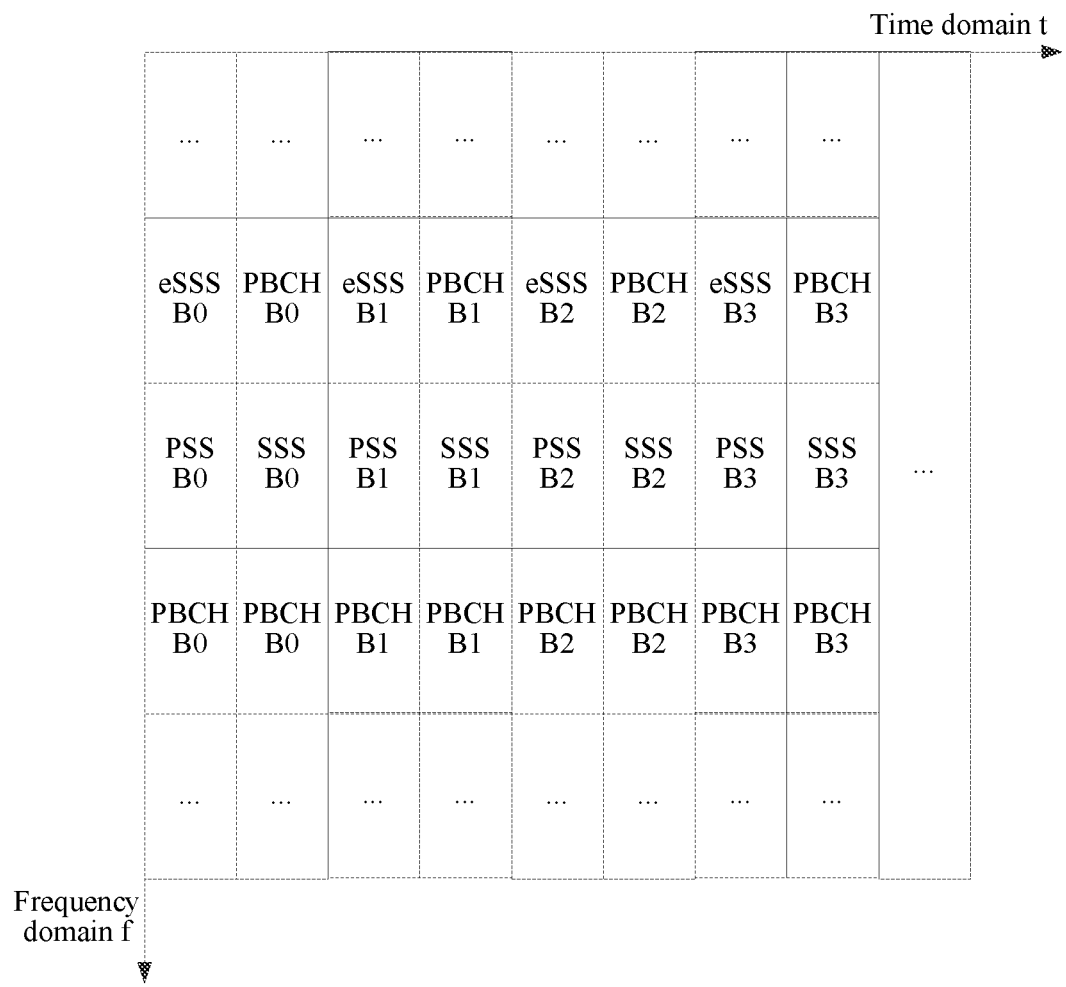
Figure 8:
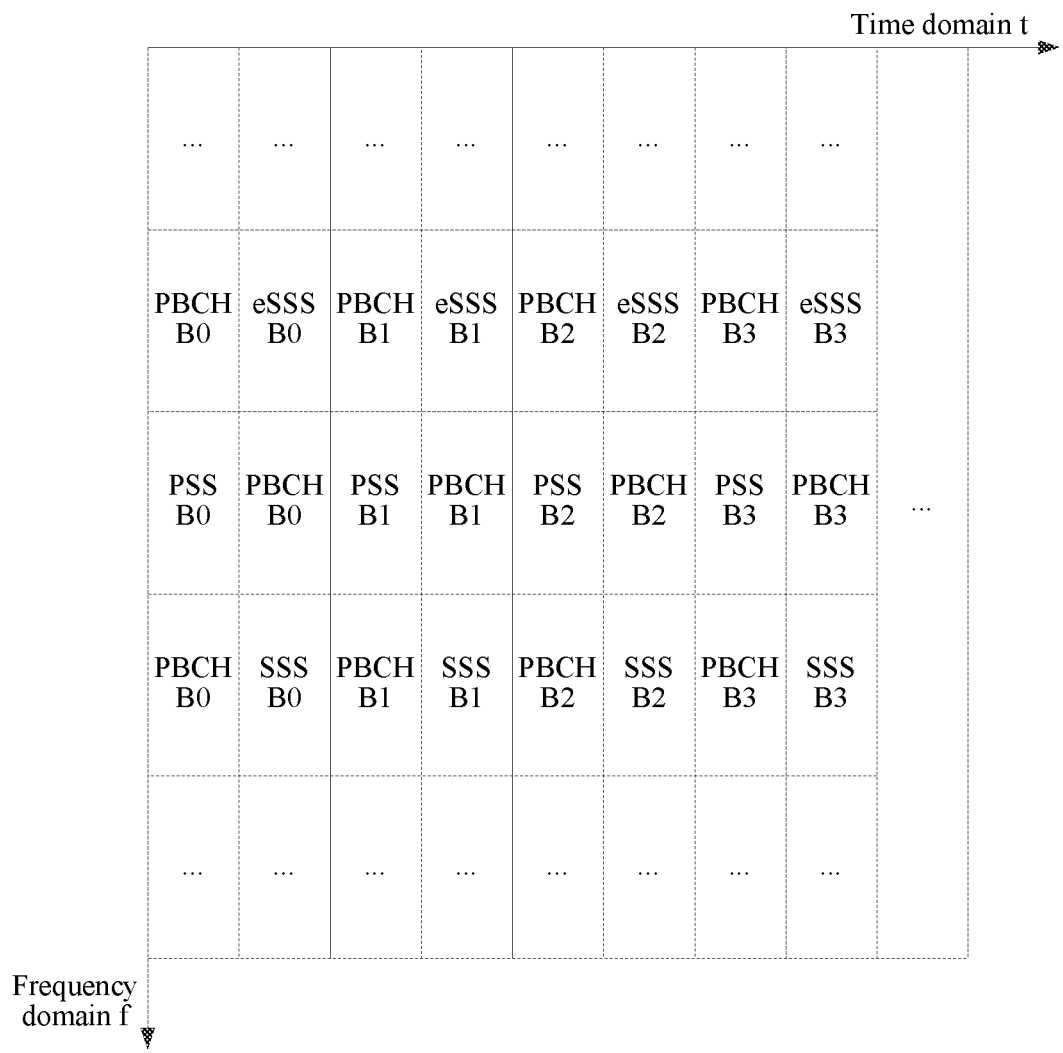

Optionally, in addition to FIG. 5, the positions of the eSSS, the PSS, the SSS and the PBCH may further have another form. For example, referring to FIG. 6 to FIG. 8, FIG. 6 to FIG. 8 are schematic diagrams of three types of resource mapping used in this disclosed embodiment.

Optionally, the first time unit is a subframe or a timeslot.

For example, in FIG. 5, one first time unit may be one subframe, or one first time unit may be one timeslot.

Optionally, for a cell or super cell, the first signal is a synchronization signal, and the index of the OFDM symbol in which the first signal is located in the first time unit is indicated by different sequences of the synchronization signal.

For example, with reference to FIG. 4 and FIG. 5, each first time unit includes four OFDM symbols, and four groups of synchronization sequences, for example, Z0, Z1, Z2, and Z3 may be set. Each group of synchronization sequences corresponds to one OFDM index (a0 to a3). For example, a corresponding relationship may be as follows:

Z0—a0;
Z1—a1;
Z2—a2; and
Z3—a3.

When the first signal is a synchronization signal, a synchronization signal carried in an OFDM symbol in each first time unit in FIG. 5 may indicate OFDM-symbol index information of an OFDM symbol, that is, indicate an index of the OFDM symbol in a first time unit.

Optionally, for a cell or super cell, in a first time unit for transmitting a synchronization signal, sequences of primary synchronization signals in synchronization signals transmitted in different OFDM symbols are used to indicate indexes of corresponding OFDM symbols in the first time unit;

in different first time units for transmitting a synchronization signal, sequences of primary synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

For example, FIG. 5 is used as an example. A PSS B0 to a PSS B3 belong to a former first time unit, a PSS B4 to a PSS B7 belong to a latter first time unit, and a position of the PSS B0 in the former first time unit and a symbol position of the PSS B4 in the latter first time unit are the same, and are both first OFDM symbols in respective first time units. When a primary synchronization signal carries a first signal, in FIG. 5, a sequence of the PSS B0 is the same as a sequence of the PSS B4. In this case, in FIG. 5, secondary synchronization signals (an SSS B0 to an SSS B3, or, an SSS B4 to an SSS B7) that belong to a single first time unit have a same signal sequence. In addition, if the two first time units shown in FIG. 5 belong to a same half-frame of the radio frame, for example, both belong to a first half-frame or both belong to a second half-frame, the sequences of the secondary synchronization signals in the two first time units are all the same. That is, the sequences of the SSS B0 to the SSS B7 are all the same.

Optionally, for a cell or super cell, in a first time unit for transmitting a synchronization signal, sequences of secondary synchronization signals in synchronization signals transmitted in different OFDM symbols are used to indicate indexes of corresponding OFDM symbols in the first time unit;

in different first time units that are used for transmitting a synchronization signal and that are in a same half-frame, sequences of secondary synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

For example, FIG. 5 is still used as an example. The SSS B0 to the SSS B3 belong to the former first time unit, the SSS B4 to the SSS B7 belong to the latter first time unit, and a position of the SSS B0 in the former first time unit and a symbol position of the SSS B4 in the latter first time unit are the same, and are both first OFDM symbols in respective first time units. When a secondary synchronization signal carries a first signal, if the two first time units shown in FIG. 5 belong to a same half-frame of the radio frame, for example, both belong to a first half-frame or both belong to a second half-frame, sequences of the SSS B0 and the SSS B4 are the same. In FIG. 5 in this case, sequences of primary synchronization signals in the two first time units are the same, that is, sequences of the PSS B0 to the PSS B7 are the same.

Optionally, for a cell or super cell, in a first time unit for transmitting a synchronization signal, sequences of third synchronization signals eSSS of synchronization signals transmitted in different OFDM symbols are used to indicate indexes of corresponding OFDM symbols in the first time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same, and sequences of secondary synchronization signals in synchronization signals transmitted in different OFDM symbols are the same;

in different first time units for transmitting a synchronization signal, sequences of primary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

For example, FIG. 5 is still used as an example. An eSSS B0 to an eSSS B3 belong to the former first time unit, an eSSS B4 to an eSSS B7 belong to the latter first time unit, and a position of the eSSS B0 in the former first time unit and a symbol position of the eSSS B4 in the latter first time unit are the same, and are both first OFDM symbols in respective first time units. When a third synchronization signal carries a first signal, sequences of the eSSS B0 and the eSSS B4 are the same. In FIG. 5 in this case, sequences of primary synchronization signals in the two first time units are the same, that is, sequences of the PSS B0 to the PSS B7 are the same. In FIG. 5 in this case, signal sequences of secondary synchronization signals (the SSS B0 to the SSS B3, or, the SSS B4 to the SSS B7) that belong to a single first time unit are the same. In addition, if the two first time units shown in FIG. 5 belong to a same half-frame of the radio frame, for example, both belong to a first half-frame or both belong to a second half-frame, sequences of secondary synchronization signals in the two first time units are the same, that is, sequences of the SSS B0 to the SSS B7 are the same.

Optionally, for a cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the radio frame;

in different first time units for transmitting a synchronization signal, sequences of third synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

For example, FIG. 5 is still used as an example. When a third synchronization signal carries a first signal and a primary synchronization signal carries a second signal, sequences of the eSSS B0 and the eSSS B4 are the same. Signal sequences of primary synchronization signals (the PSS B0 to the PSS B3, or, the PSS B4 to the PSS B7) that belong to a single first time unit are the same. If the two first time units shown in FIG. 5 belong to a same half-frame of the radio frame, for example, both belong to a first half-frame or both belong to a second half-frame, sequences of secondary synchronization signals in the two first time units are the same, that is, sequences of the SSS B0 to the SSS B7 are the same.

Optionally, for a cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the radio frame;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

For example, FIG. 5 is still used as an example. When a third synchronization signal carries a first signal and a secondary synchronization signal carries a second signal, sequences of the eSSS B0 and the eSSS B4 are the same. In FIG. 5 in this case, sequences of primary synchronization signals in the two first time units are the same, that is, sequences of the PSS B0 to the PSS B7 are the same.

Optionally, for a cell or super cell, in a first time unit for transmitting a synchronization signal, sequences of primary synchronization signals in synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the radio frame; and in different first time units for transmitting a synchronization signal, sequences of primary synchronization signals in OFDM symbols corresponding to a same OFDM symbol index are the same.

For example, FIG. 5 is still used as an example. When a primary synchronization signal carries a first signal and a secondary synchronization signal carries a second signal, sequences of the PSS B0 and the PSS B4 are the same.

Optionally, for a cell or super cell, in a first time unit for transmitting a synchronization signal, sequences of secondary synchronization signals in synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the radio frame; and in different first time units that are used for transmitting a synchronization signal and that are in a same half-frame, sequences of secondary synchronization signals in OFDM symbols corresponding to a same OFDM symbol index are the same.

For example, FIG. 5 is still used as an example. When a secondary synchronization signal carries a first signal and a primary synchronization signal carries a second signal, if the two first time units shown in FIG. 5 belong to a same half-frame of the radio frame, for example, both belong to a first half-frame or both belong to a second half-frame, sequences of the SSS B0 and the SSS B4 in the two first time units are the same.

Optionally, for a cell or super cell, a sequence of the primary synchronization signal in the synchronization signal is used to identify cell ID information in one cell ID group; and a sequence of the secondary synchronization signal in the synchronization signal is used to identify information of a cell ID group.

In this embodiment of this application, in addition to carrying the first signal and/or the second signal, a synchronization signal may further be used to indicate a cell ID and a cell ID group corresponding to a signal.

Optionally, for a cell or super cell, when the first signal is a synchronization signal and the second signal is a broadcast signal, signaling of the broadcast signal explicitly indicates first-time-unit index information of the broadcast signal; and/or scrambling code in the broadcast signal carries the first-time-unit index information; and/or a mask of cyclic redundancy check code CRC in the broadcast signal carries the first-time-unit index information.

In this embodiment of this application, when a broadcast signal carries a second signal, scrambling code and/or a mask of the broadcast signal may further carry a first signal, to facilitate authentication when subsequently the second network device parses the second signal.

Optionally, for a cell or super cell, when the first signal is a synchronization signal and the second signal is a broadcast signal, signaling of the broadcast signal explicitly indicates first-time-unit index information of the broadcast signal; and scrambling code in the broadcast signal carries OFDM-symbol index information corresponding to the broadcast signal or OFDM-symbol index information of a synchronization signal corresponding to the broadcast signal.

In this embodiment of this application, when a synchronization signal carries a first signal and a broadcast signal carries a second signal, scrambling code in the broadcast signal may further carry OFDM-symbol index information (that is, an index of the OFDM symbol in the first time unit) corresponding to an OFDM symbol in which the broadcast signal is located, or, scrambling code in the broadcast signal may carry OFDM-symbol index information corresponding to an OFDM symbol in which a synchronization signal associated with the broadcast signal is located.

Optionally, for a cell or super cell, when the first signal is a synchronization signal and the second signal is a broadcast signal, signaling of the broadcast signal explicitly indicates first-time-unit index information of the broadcast signal; and a mask of CRC (Cyclic Redundancy Check, cyclic redundancy check) of the broadcast signal carries OFDM-symbol index information corresponding to the broadcast signal or OFDM-symbol index information of a synchronization signal corresponding to the broadcast signal.

In this embodiment of this application, when a synchronization signal carries a first signal and a broadcast signal carries a second signal, a mask of CRC in the broadcast signal may further carry OFDM-symbol index information corresponding to an OFDM symbol (that is, an index of the OFDM symbol in the first time unit) in which the broadcast signal is located, or, a mask of CRC in the broadcast signal may carry OFDM-symbol index information corresponding to an OFDM symbol in which a synchronization signal associated with the broadcast signal is located.

Optionally, for a cell or super cell, a maximum quantity of indexes of the first time unit is less than or equal to a quantity of first time units in one radio frame.

In this embodiment of this application, a quantity of indexes of the first time unit should be less than or equal to a quantity of first time units in one radio frame.

Optionally, for a cell or super cell, a position of a first time unit for sending the first signal by the first network device in one radio frame is changeable.

In this embodiment of this application, a position of a first time unit in which a first signal can be sent in one radio frame is not fixed, but instead may adaptively change based on an actual application.

Optionally, for a cell or super cell, a position of a first time unit for sending the second signal by the first network device in one radio frame is changeable.

In this embodiment of this application, a position of a first time unit in which a second signal can be sent in one radio frame is not fixed, but instead may adaptively change based on an actual application.

Optionally, for a cell or super cell, a quantity of first time units occupied by the first network device to send the first signal in one radio frame is changeable.

In this embodiment of this application, a quantity of first time units occupied to send the first signal in one radio frame is not fixed, but instead may adaptively change based on an actual application.

Optionally, for a cell or super cell, a quantity of first time units occupied by the first network device to send the second signal in one radio frame is changeable.

In this embodiment of this application, a quantity of first time units occupied to send the second signal in one radio frame is not fixed, but instead may adaptively change based on an actual application.

Optionally, for a cell or super cell, a time-frequency resource corresponding to the first signal is associated with a time-frequency resource corresponding to the second signal.

For example, FIG. 5 to FIG. 8 are used as an example. In this embodiment of this application, when the first signal and the second signal are associated with each other, it may be that a time-frequency resource corresponding to the first signal is associated with a time-frequency resource corresponding to the second signal, that is, a time-frequency resource corresponding to the associated second signal may be determined based on a time-frequency resource corresponding to the first signal, or, a time-frequency resource corresponding to the associated first signal may be determined based on a time-frequency resource corresponding to the second signal.

Optionally, for a cell or super cell, a time-frequency resource corresponding to the first signal and a time-frequency resource corresponding to the second signal are frequency division multiplexed in a same OFDM symbol; or a time-frequency resource corresponding to the first signal and a time-frequency resource corresponding to the second signal are time division multiplexed in different OFDM symbols.

For example, FIG. 5 is used as an example. One of any two of a PBCH, an eSSS, a PSS, and an SSS is used to carry a first signal, and the other of the two is used to carry a second signal. In this case, for a first signal and a second signal that are associated with each other, time-frequency resources of the first signal and the second signal are in a same OFDM symbol, that is, respectively occupy different subcarriers or frequency bands in a same OFDM symbol.

Alternatively, FIG. 7 is used as an example, it is assumed that a PBCH is used to carry a first signal and an eSSS carries a second signal, or, a PBCH carries a second signal and an eSSS carries a second signal. In this case, for a first signal and a second signal that are associated with each other, time-frequency resources of the first signal and the second signal are in different OFDM symbols, that is, respectively occupy different OFDM symbols in a same frequency band or different frequency bands.

Optionally, a quantity of sequences in a sequence set of a primary synchronization signal is less than a quantity of sequences in a sequence set of a secondary synchronization signal; or a quantity of sequences in a sequence set of a primary synchronization signal is less than a quantity of sequences in a sequence set of a secondary synchronization signal, and the quantity of sequences in the sequence set of the secondary synchronization signal is less than a quantity of sequences in a sequence set of a third synchronization signal.

Step 301 may be implemented by the processor 21 in the embodiment shown in FIG. 2 for executing the signal sending module 23a1.

Step 302: A second network device detects one of the X first signal(s) and one of the Y second signal(s) that are sent by the first network device.

In this embodiment of this application, the first network device sends one of the X first signal(s) and one of the Y second signal(s) by using different beams. When receiving a detection signal, the second network device may detect only a first signal sent on one beam and a second signal associated with the first signal.

Step 302 may be implemented by the processor 21 in the embodiment shown in FIG. 2 for executing the detection module 23a2.

Step 303: The second network device obtains the OFDM-symbol index information based on the first signal, and obtains the first-time-unit index information based on the second signal.

The OFDM-symbol index information indicates an index of an OFDM symbol in which the first signal is located in the first time unit, the first-time-unit index information indicates an index of a first time unit in which the second signal is located in a radio frame, one radio frame includes at least two first time units, and each first time unit includes at least two OFDM symbols.

After detecting the first signal and the second signal that are associated with each other, the second network device may determine, based on the OFDM-symbol index information indicated by the first signal and the first-time-unit index information indicated by the second signal, a position of an OFDM symbol in which the first signal is located in the radio frame, to implement frame timing.

Step 303 may be implemented by the processor 21 in the embodiment shown in FIG. 2 for executing the information obtaining module 23a3.

In conclusion, in the solution shown in this embodiment of this application, the first network device sends the X first signal(s) and the Y second signal(s), where each second signal is associated with at least one first signal, where the first signal carries orthogonal frequency division multiplexing OFDM-symbol index information, the OFDM-symbol index information indicates an index of an OFDM symbol in which the first signal is located in a first time unit, the second signal carries the first-time-unit index information, the first-time-unit index information indicates an index of a first time unit in which the second signal is located in the radio frame, one radio frame includes at least two first time units, and each first time unit includes at least two OFDM symbols; and the second network device detects one of the X first signal(s) and one of the Y second signal(s) that are sent by the first network device, obtains the OFDM-symbol index information based on the first signal, and obtains the first-time-unit index information based on the second signal, to determine a position of the first signal in the radio frame, to implement frame timing.

Figure 9:
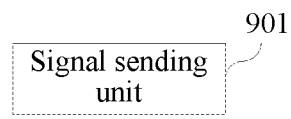
FIG. 9 is a block diagram of a signal sending apparatus according to an embodiment of this application.

Referring to FIG. 9, FIG. 9 is a block diagram of a signal sending apparatus according to an embodiment of this application. The apparatus may be implemented, in a manner of hardware or a combination of software and hardware, as a part of the first network device 110 or the entire first network device 110 in the network environment shown in FIG. 1, to perform all or some of the steps performed by the first network device shown in FIG. 3. The apparatus may include a signal sending unit 901.

In this embodiment, the apparatus is shown in a form of a functional unit. "The unit" herein may be an application-specific integrated circuit (application-specific integrated circuit, ASIC), a circuit, a processor and a memory that execute one or more software or firmware programs, an integrated logical circuit, and/or another device that can provide the foregoing functions.

The signal sending unit 901 has functions that are the same as or similar to those of the signal sending module 23a1.

Figure 10:
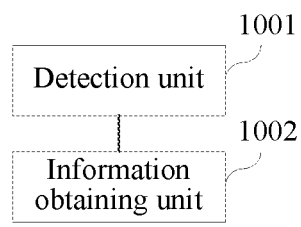
FIG. 10 is a block diagram of a signal receiving apparatus according to an embodiment of this application.

Referring to FIG. 10, FIG. 10 is a block diagram of a signal receiving apparatus according to an embodiment of this application. The apparatus may be implemented, in a manner of hardware or a combination of software and hardware, as a part of the second network device 120 or the entire second network device 120 in the network environment shown in FIG. 1, to perform all or some of the steps performed by the second network device as shown in FIG. 4. The apparatus may include a detection unit 1001 and an information obtaining unit 1002.

In this embodiment, the apparatus is shown in a form of a functional unit. "The unit" herein may be an application-specific integrated circuit (application-specific integrated circuit, ASIC), a circuit, a processor and a memory that execute one or more software or firmware programs, an integrated logical circuit, and/or another device that can provide the foregoing functions.

The detection unit 1001 has functions that are the same as or similar to those of the detection module 23a2.

The information obtaining unit 1002 has functions that are the same as or similar to those of the information obtaining module 23a3.

Further embodiments of the present invention are provided in the following. It should be noted that the numbering used in the following section does not necessarily need to comply with the numbering used in the previous sections.

Embodiment 1

An apparatus for signal transmitting, wherein the apparatus comprises:
a signal sending unit, configured to send X first signal(s) and Y second signal(s), wherein each second signal is associated with at least one first signal, X is an integer greater than or equal to 1, and Y is an integer greater than or equal to 1, wherein
the first signal carries orthogonal frequency division multiplexing OFDM-symbol index information, the OFDM-symbol index information indicates an index of an OFDM symbol in which the first signal is located in a first time unit, the second signal carries first-time-unit index information, the first-time-unit index information indicates an index of a first time unit in which the second signal is located in a second time unit, one second time unit comprises at least two first time units, and each first time unit comprises at least two OFDM symbols.

Embodiment 2

The apparatus according to embodiment 1, wherein among the X first signal(s) and the Y second signal(s), one first signal and one second signal that are associated with each other are located on a single transmit beam.

Embodiment 3

The apparatus according to embodiment 1, wherein among the X first signal(s) and the Y second signal(s), one first signal and one second signal that are associated with each other are located in a single first time unit.

Embodiment 4

The apparatus according to embodiment 1, wherein for a same cell or super cell,
the first signal is a synchronization signal, and the second signal is a broadcast signal; or
the first signal is a broadcast signal, and the second signal is a synchronization signal; or the first signal is a synchronization signal, and the second signal is a synchronization signal.

Embodiment 5

The apparatus according to embodiment 4, wherein
the synchronization signal comprises a primary synchronization signal and a secondary synchronization signal; or
the synchronization signal comprises a primary synchronization signal, a secondary synchronization signal, and a third synchronization signal eSSS; and
the primary synchronization signal and the secondary synchronization signal comprised in each synchronization signal are located in a single first time unit.

Embodiment 6

The apparatus according to any one of embodiments 1 to 5, wherein the first time unit is a subframe or a timeslot.

Embodiment 7

The apparatus according to embodiment 4 or 5, wherein for a same cell or super cell,
the first signal is a synchronization signal, and the index of the OFDM symbol in which the first signal is located in the first time unit is indicated by different sequences of the synchronization signal.

Embodiment 8

The apparatus according to embodiment 7, wherein for a same cell or super cell,
in a first time unit for transmitting a synchronization signal, sequences of primary synchronization signals in synchronization signals transmitted in different OFDM symbols are used to indicate indexes of corresponding OFDM symbols in the first time unit;
in different first time units for transmitting a synchronization signal, sequences of primary synchronization signals in OFDM symbols corresponding to a same OFDM symbol index are the same;
in a first time unit for transmitting a synchronization signal, sequences of secondary synchronization signals in synchronization signals transmitted in different OFDM symbols are the same; and
in different first time units that are used for transmitting a synchronization signal and that are in a same half-frame, sequences of secondary synchronization signals in synchronization signals transmitted in different OFDM symbols are the same.

Embodiment 9

The apparatus according to embodiment 7, wherein for a same cell or super cell,
in a first time unit for transmitting a synchronization signal, sequences of secondary synchronization signals in synchronization signals transmitted in different OFDM symbols are used to indicate indexes of corresponding OFDM symbols in the first time unit;
in different first time units that are used for transmitting a synchronization signal and that are in a same half-frame, sequences of secondary synchronization signals in OFDM symbols corresponding to a same OFDM symbol index are the same;
in a first time unit for transmitting a synchronization signal, sequences of primary synchronization signals in synchronization signals transmitted in different OFDM symbols are the same; and
in different first time units for transmitting a synchronization signal, sequences of primary synchronization signals in synchronization signals transmitted in different OFDM symbols are the same.

Embodiment 10

The apparatus according to embodiment 7, wherein for a same cell or super cell,
in a first time unit for transmitting a synchronization signal, sequences of third synchronization signals eSSS of synchronization signals transmitted in different OFDM symbols are used to indicate indexes of corresponding OFDM symbols in the first time unit;
in different first time units for transmitting a synchronization signal, sequences of third synchronization signals in OFDM symbols corresponding to a same OFDM symbol index are the same;
in a first time unit for transmitting a synchronization signal, sequences of primary synchronization signals in synchronization signals transmitted in different OFDM symbols are the same, and sequences of secondary synchronization signals in synchronization signals transmitted in different OFDM symbols are the same;
in different first time units for transmitting a synchronization signal, sequences of primary synchronization signals in synchronization signals transmitted in different OFDM symbols are the same; and
in different first time units that are used for transmitting a synchronization signal and that are in a same half-frame, sequences of secondary synchronization signals in synchronization signals transmitted in different OFDM symbols are the same.

Embodiment 11

The apparatus according to embodiment 7, wherein for a same cell or super cell,
in a first time unit for transmitting a synchronization signal, sequences of third synchronization signals eSSS of synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit;
in different first time units for transmitting a synchronization signal, sequences of third synchronization signals in OFDM symbols corresponding to a same OFDM symbol index are the same;
in a first time unit for transmitting a synchronization signal, sequences of secondary synchronization signals in synchronization signals transmitted in different OFDM symbols are the same; and
in different first time units that are used for transmitting a synchronization signal and that are in a same half-frame, sequences of secondary synchronization signals in synchronization signals transmitted in different OFDM symbols are the same.

Embodiment 12

The apparatus according to claim 7, wherein for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Embodiment 13

The apparatus according to claim 7, wherein for a same cell or super cell, in a first time unit for transmitting a synchronization signal, sequences of primary synchronization signals in synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit; and in different first time units for transmitting a synchronization signal, sequences of primary synchronization signals in OFDM symbols corresponding to a same OFDM symbol index are the same.

Embodiment 14

The apparatus according to embodiment 7, wherein for a same cell or super cell, in a first time unit for transmitting a synchronization signal, sequences of secondary synchronization signals in synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit; and in different first time units that are used for transmitting a synchronization signal and that are in a same half-frame, sequences of secondary synchronization signals in OFDM symbols corresponding to a same OFDM symbol index are the same.

Embodiment 15

The apparatus according to any one of embodiments 8 to 14, wherein for a same cell or super cell, a sequence of the primary synchronization signal in the synchronization signal is used to identify cell ID information in one cell ID group; and a sequence of the secondary synchronization signal in the synchronization signal is used to identify information of a cell ID group.

Embodiment 16

The apparatus according to any one of embodiments 7 to 14, wherein for a same cell or super cell, when the first signal is a synchronization signal and the second signal is a broadcast signal, signaling of the broadcast signal explicitly indicates first-time-unit index information of the broadcast signal; and/or scrambling code in the broadcast signal carries the first-time-unit index information; and/or a mask of cyclic redundancy check code CRC in the broadcast signal carries the first-time-unit index information.

Embodiment 17

The apparatus according to any one of embodiments 7 to 14, wherein for a same cell or super cell, when the first signal is a synchronization signal and the second signal is a broadcast signal, signaling of the broadcast signal explicitly indicates first-time-unit index information of the broadcast signal; and scrambling code in the broadcast signal carries OFDM-symbol index information corresponding to the broadcast signal or OFDM-symbol index information of a synchronization signal corresponding to the broadcast signal.

Embodiment 18

The apparatus according to any one of embodiments 7 to 14, wherein for a same cell or super cell, when the first signal is a synchronization signal and the second signal is a broadcast signal, signaling of the broadcast signal explicitly indicates first-time-unit index information of the broadcast signal; and a mask of CRC in the broadcast signal carries OFDM-symbol index information corresponding to the broadcast signal or OFDM-symbol index information of a synchronization signal corresponding to the broadcast signal.

Embodiment 19

The apparatus according to any one of embodiments 16 to 18, wherein for a same cell or super cell, a maximum quantity of indexes of the first time unit is less than or equal to a quantity of first time units in one second time unit.

Embodiment 20

The apparatus according to any one of embodiments 1 to 19, wherein for a same cell or super cell, a position of a first time unit for sending the first signal by a first network device in one second time unit is changeable.

Embodiment 21

The apparatus according to any one of embodiments 1 to 19, wherein for a same cell or super cell, a position of a first time unit for sending the second signal by a first network device in one second time unit is changeable.

Embodiment 22

The apparatus according to any one of embodiments 1 to 19, wherein for a same cell or super cell, a quantity of first time units occupied by a first network device to send the first signal in one second time unit is changeable.

Embodiment 23

The apparatus according to any one of embodiments 1 to 19, wherein for a same cell or super cell, a first network device a quantity of first time units occupied to send the second signal in one second time unit is changeable.

Embodiment 24

The apparatus according to any one of embodiments 1 to 23, wherein for a same cell or super cell, a time-frequency resource corresponding to the first signal is associated with a time-frequency resource corresponding to the second signal.

Embodiment 25

The apparatus according to any one of embodiments 1 to 24, wherein for a same cell or super cell, a time-frequency resource corresponding to the first signal and a time-frequency resource corresponding to the second signal are frequency division multiplexed in a same OFDM symbol; or a time-frequency resource corresponding to the first signal and a time-frequency resource corresponding to the second signal are time division multiplexed in different OFDM symbols.

Embodiment 26

An apparatus for signal receiving, wherein the apparatus comprises:

a detection unit, configured to detect one of X first signal(s) and one of Y second signal(s) that are sent by a first network device, wherein X is an integer greater than or equal to 1, and Y is an integer greater than or equal to 1; and an information obtaining unit, configured to: obtain orthogonal frequency division multiplexing-symbol (OFDM-symbol) index information based on the first signal, and obtain first-time-unit index information based on the second signal, wherein the OFDM-symbol index information indicates an index of an OFDM symbol in which the first signal is located in a first time unit, the first-time-unit index information indicates an index of a first time unit in which the second signal is located in a second time unit, one second time unit comprises at least two first time units, and each first time unit comprises at least two OFDM symbols.

Embodiment 27

The apparatus according to embodiment 26, wherein among the X first signal(s) and the Y second signal(s), one first signal and one second signal that are associated with each other are located on a single transmit beam.

Embodiment 28

The apparatus according to embodiment 26, wherein among the X first signal(s) and the Y second signal(s), one first signal and one second signal that are associated with each other are located in a single first time unit.

Embodiment 29

The apparatus according to embodiment 26, wherein for a same cell or super cell, the first signal is a synchronization signal, and the second signal is a broadcast signal; or the first signal is a broadcast signal, and the second signal is a synchronization signal; or the first signal is a synchronization signal, and the second signal is a synchronization signal.

Embodiment 30

The apparatus according to embodiment 29, wherein the synchronization signal comprises a primary synchronization signal and a secondary synchronization signal; or the synchronization signal comprises a primary synchronization signal, a secondary synchronization signal, and a third synchronization signal eSSS; and the primary synchronization signal and the secondary synchronization signal comprised in each synchronization signal are located in a single first time unit.

Embodiment 31

The apparatus according to any one of embodiments 26 to 30, wherein the first time unit is a subframe or a timeslot.

Embodiment 32

The apparatus according to embodiment 29 or 30, wherein for a same cell or super cell, the first signal is a synchronization signal, and the index of the OFDM symbol in which the first signal is located in the first time unit is indicated by different sequences of the synchronization signal.

Embodiment 33

The apparatus according to embodiment 32, wherein for a same cell or super cell, in a first time unit for transmitting a synchronization signal, sequences of primary synchronization signals in synchronization signals transmitted in different OFDM symbols are used to indicate indexes of corresponding OFDM symbols in the first time unit;

in different first time units for transmitting a synchronization signal, sequences of primary synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Embodiment 34

The apparatus according to embodiment 32, wherein for a same cell or super cell, in a first time unit for transmitting a synchronization signal, sequences of secondary synchronization signals in synchronization signals transmitted in different OFDM symbols are used to indicate indexes of corresponding OFDM symbols in the first time unit;

in different first time units that are used for transmitting a synchronization signal and that are in a same half-frame, sequences of secondary synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Embodiment 35

The apparatus according to embodiment 32, wherein for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same, and sequences of secondary synchronization signals in synchronization signals transmitted in different OFDM symbols are the same;

in different first time units for transmitting a synchronization signal, sequences of primary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Embodiment 36

The apparatus according to embodiment 32, wherein for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Embodiment 37

The apparatus according to embodiment 32, wherein for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Embodiment 38

The apparatus according to embodiment 32, wherein for a same cell or super cell, in a first time unit for transmitting a synchronization signal, sequences of primary synchronization signals in synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit; and in different first time units for transmitting a synchronization signal, sequences of primary synchronization signals in OFDM symbols corresponding to a same OFDM symbol index are the same.

Embodiment 39

The apparatus according to embodiment 32, wherein for a same cell or super cell, in a first time unit for transmitting a synchronization signal, sequences of secondary synchronization signals in synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit; and in different first time units that are used for transmitting a synchronization signal and that are in a same half-frame, sequences of secondary synchronization signals in OFDM symbols corresponding to a same OFDM symbol index are the same.

Embodiment 40

The apparatus according to any one of embodiments 31 to 39, wherein for a same cell or super cell, a sequence of the primary synchronization signal in the synchronization signal is used to identify cell ID information in one cell ID group; and a sequence of the secondary synchronization signal in the synchronization signal is used to identify information of a cell ID group.

Embodiment 41

The apparatus according to any one of embodiments 30 to 39, wherein for a same cell or super cell, when the first signal is a synchronization signal and the second signal is a broadcast signal, signaling of the broadcast signal explicitly indicates first-time-unit index information of the broadcast signal; and/or scrambling code in the broadcast signal carries the first-time-unit index information; and/or a mask of cyclic redundancy check code CRC in the broadcast signal carries the first-time-unit index information.

Embodiment 42

The apparatus according to any one of embodiments 30 to 39, wherein for a same cell or super cell, when the first signal is a synchronization signal and the second signal is a broadcast signal, signaling of the broadcast signal explicitly indicates first-time-unit index information of the broadcast signal; and scrambling code in the broadcast signal carries OFDM-symbol index information corresponding to the broadcast signal or OFDM-symbol index information of a synchronization signal corresponding to the broadcast signal.

Embodiment 43

The apparatus according to any one of embodiments 30 to 39, wherein for a same cell or super cell, when the first signal is a synchronization signal and the second signal is a broadcast signal, signaling of the broadcast signal explicitly indicates first-time-unit index information of the broadcast signal; and a mask of CRC in the broadcast signal carries OFDM-symbol index information corresponding to the broadcast signal or OFDM-symbol index information of a synchronization signal corresponding to the broadcast signal.

Embodiment 44

The apparatus according to any one of embodiments 41 to 43, wherein for a same cell or super cell, a maximum quantity of indexes of the first time unit is less than or equal to a quantity of first time units in one second time unit.

Embodiment 45

The apparatus according to any one of embodiments 26 to 44, wherein for a same cell or super cell, a position of a first time unit for sending the first signal by the first network device in one second time unit is changeable.

Embodiment 46

The apparatus according to any one of embodiments 26 to 44, wherein for a same cell or super cell, a position of a first time unit for sending the second signal by the first network device in one second time unit is changeable.

Embodiment 47

The apparatus according to any one of embodiments 26 to 44, wherein for a same cell or super cell, a quantity of first time units occupied by the first network device to send the first signal in one second time unit is changeable.

Embodiment 48

The apparatus according to any one of embodiments 26 to 44, wherein for a same cell or super cell, a quantity of first time units occupied by the first network device to send the second signal in one second time unit is changeable.

Embodiment 49

The apparatus according to any one of embodiments 26 to 48, wherein for a same cell or super cell, a time-frequency resource corresponding to the first signal is associated with a time-frequency resource corresponding to the second signal.

Embodiment 50

The apparatus according to any one of embodiments 26 to 49, wherein for a same cell or super cell, a time-frequency resource corresponding to the first signal and a time-frequency resource corresponding to the second signal are frequency division multiplexed in a same OFDM symbol; or a time-frequency resource corresponding to the first signal and a time-frequency resource corresponding to the second signal are time division multiplexed in different OFDM symbols.

Embodiment 51

A method for signal transmitting, wherein the method comprises:

sending, by a first network device, X first signal(s) and Y second signal(s), wherein each second signal is associated with at least one first signal, X is an integer greater than or equal to 1, and Y is an integer greater than or equal to 1, wherein the first signal carries orthogonal frequency division multiplexing OFDM-symbol index information, the OFDM-symbol index information indicates an index of an OFDM symbol in which the first signal is located in a first time unit, the second signal carries first-time-unit index information, the first-time-unit index information indicates an index of a first time unit in which the second signal is located in a second time unit, one second time unit comprises at least two first time units, and each first time unit comprises at least two OFDM symbols.

Embodiment 52

The method according to embodiment 51, wherein
among the X first signal(s) and the Y second signal(s), one first signal and one second signal that are associated with each other are located on a single transmit beam.

Embodiment 53

The method according to embodiment 51, wherein
among the X first signal(s) and the Y second signal(s), one first signal and one second signal that are associated with each other are located in a single first time unit.

Embodiment 54

The method according to embodiment 51, wherein for a same cell or super cell,
the first signal is a synchronization signal, and the second signal is a broadcast signal; or
the first signal is a broadcast signal, and the second signal is a synchronization signal; or
the first signal is a synchronization signal, and the second signal is a synchronization signal.

55. The method according to embodiment 54, wherein the synchronization signal comprises a primary synchronization signal and a secondary synchronization signal; or
the synchronization signal comprises a primary synchronization signal, a secondary synchronization signal, and a third synchronization signal eSSS; and
the primary synchronization signal and the secondary synchronization signal comprised in each synchronization signal are located in a single first time unit.

Embodiment 56

The method according to any one of embodiments 51 to 55, wherein the first time unit is a subframe or a timeslot.

Embodiment 57

The method according to embodiment 53 or 54, wherein for a same cell or super cell,
the first signal is a synchronization signal, and the index of the OFDM symbol in which the first signal is located in the first time unit is indicated by different sequences of the synchronization signal.

Embodiment 58

The method according to embodiment 57, wherein for a same cell or super cell,
in a first time unit for transmitting a synchronization signal, sequences of primary synchronization signals in synchronization signals transmitted in different OFDM symbols are used to indicate indexes of corresponding OFDM symbols in the first time unit;
in different first time units for transmitting a synchronization signal, sequences of primary synchronization signals in OFDM symbols corresponding to a same OFDM symbol index are the same;
in a first time unit for transmitting a synchronization signal, sequences of secondary synchronization signals in synchronization signals transmitted in different OFDM symbols are the same; and
in different first time units that are used for transmitting a synchronization signal and that are in a same half-frame, sequences of secondary synchronization signals in synchronization signals transmitted in different OFDM symbols are the same.

Embodiment 59

The method according to embodiment 57, wherein for a same cell or super cell,
in a first time unit for transmitting a synchronization signal, sequences of secondary synchronization signals in synchronization signals transmitted in different OFDM symbols are used to indicate indexes of corresponding OFDM symbols in the first time unit;
in different first time units that are used for transmitting a synchronization signal and that are in a same half-frame, sequences of secondary synchronization signals in OFDM symbols corresponding to a same OFDM symbol index are the same;
in a first time unit for transmitting a synchronization signal, sequences of primary synchronization signals in synchronization signals transmitted in different OFDM symbols are the same; and
in different first time units for transmitting a synchronization signal, sequences of primary synchronization signals in synchronization signals transmitted in different OFDM symbols are the same.

Embodiment 60

The method according to embodiment 57, wherein for a same cell or super cell,
in a first time unit for transmitting a synchronization signal, sequences of third synchronization signals eSSS of synchronization signals transmitted in different OFDM symbols are used to indicate indexes of corresponding OFDM symbols in the first time unit;
in different first time units for transmitting a synchronization signal, sequences of third synchronization signals in OFDM symbols corresponding to a same OFDM symbol index are the same;
in a first time unit for transmitting a synchronization signal, sequences of primary synchronization signals in synchronization signals transmitted in different OFDM symbols are the same, and sequences of secondary synchronization signals in synchronization signals transmitted in different OFDM symbols are the same; and
in different first time units for transmitting a synchronization signal, sequences of primary synchronization signals in synchronization signals transmitted in different OFDM symbols are the same; and
in different first time units that are used for transmitting a synchronization signal and that are in a same half-frame, sequences of secondary synchronization signals in synchronization signals transmitted in different OFDM symbols are the same.

Embodiment 61

The method according to embodiment 57, wherein for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Embodiment 62

The method according to embodiment 57, wherein for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Embodiment 63

The method according to embodiment 57, wherein for a same cell or super cell, in a first time unit for transmitting a synchronization signal, sequences of primary synchronization signals in synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit; and in different first time units for transmitting a synchronization signal, sequences of primary synchronization signals in OFDM symbols corresponding to a same OFDM symbol index are the same.

Embodiment 64

The method according to embodiment 57, wherein for a same cell or super cell, in a first time unit for transmitting a synchronization signal, sequences of secondary synchronization signals in synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit; and in different first time units that are used for transmitting a synchronization signal and that are in a same half-frame, sequences of secondary synchronization signals in OFDM symbols corresponding to a same OFDM symbol index are the same.

Embodiment 65

The method according to any one of embodiments 58 to 64, wherein for a same cell or super cell, a sequence of the primary synchronization signal in the synchronization signal is used to identify cell ID information in one cell ID group; and a sequence of the secondary synchronization signal in the synchronization signal is used to identify information of a cell ID group.

Embodiment 66

The method according to any one of embodiments 57 to 64, wherein for a same cell or super cell, when the first signal is a synchronization signal and the second signal is a broadcast signal, signaling of the broadcast signal explicitly indicates first-time-unit index information of the broadcast signal; and/or scrambling code in the broadcast signal carries the first-time-unit index information; and/or a mask of cyclic redundancy check code CRC in the broadcast signal carries the first-time-unit index information.

Embodiment 67

The method according to any one of embodiments 57 to 64, wherein for a same cell or super cell, when the first signal is a synchronization signal and the second signal is a broadcast signal, signaling of the broadcast signal explicitly indicates first-time-unit index information of the broadcast signal; and scrambling code in the broadcast signal carries OFDM-symbol index information corresponding to the broadcast signal or OFDM-symbol index information of a synchronization signal corresponding to the broadcast signal.

Embodiment 68

The method according to any one of embodiments 57 to 64, wherein for a same cell or super cell, when the first signal is a synchronization signal and the second signal is a broadcast signal, signaling of the broadcast signal explicitly indicates first-time-unit index information of the broadcast signal; and a mask of CRC in the broadcast signal carries OFDM-symbol index information corresponding to the broadcast signal or OFDM-symbol index information of a synchronization signal corresponding to the broadcast signal.

Embodiment 69

The method according to any one of embodiments 57 to 64, wherein for a same cell or super cell,
a maximum quantity of indexes of the first time unit is less than or equal to a quantity of first time units in one second time unit.

Embodiment 70

The method according to any one of embodiments 51 to 69, wherein for a same cell or super cell,
a position of a first time unit for sending the first signal by the first network device in one second time unit is changeable.

Embodiment 71

The method according to any one of embodiments 51 to 69, wherein for a same cell or super cell,
a position of a first time unit for sending the second signal by the first network device in one second time unit is changeable.

Embodiment 72

The method according to any one of embodiments 51 to 69, wherein for a same cell or super cell,
a quantity of first time units occupied by the first network device to send the first signal in one second time unit is changeable.

Embodiment 73

The method according to any one of embodiments 51 to 69, wherein for a same cell or super cell,
a quantity of first time units occupied by the first network device to send the second signal in one second time unit is changeable.

Embodiment 74

The method according to any one of embodiments 51 to 73, wherein for a same cell or super cell,
a time-frequency resource corresponding to the first signal is associated with a time-frequency resource corresponding to the second signal.

Embodiment 75

The method according to any one of embodiments 51 to 74, wherein for a same cell or super cell,
a time-frequency resource corresponding to the first signal and a time-frequency resource corresponding to the second signal are frequency division multiplexed in a same OFDM symbol; or
a time-frequency resource corresponding to the first signal and a time-frequency resource corresponding to the second signal are time division multiplexed in different OFDM symbols.

Embodiment 76

A method for signal receiving, wherein the method comprises:
detecting, by a second network device, one of X first signal(s) and one of Y second signal(s) that are sent by a first network device, wherein X is an integer greater than or equal to 1, and Y is an integer greater than or equal to 1; and
obtaining, by the second network device, OFDM-symbol index information based on the first signal, and obtaining first-time-unit index information based on the second signal, wherein the OFDM-symbol index information indicates an index of an OFDM symbol in which the first signal is located in a first time unit, the first-time-unit index information indicates an index of a first time unit in which the second signal is located in a second time unit, one second time unit comprises at least two first time units, and each first time unit comprises at least two OFDM symbols.

Embodiment 77

The method according to embodiment 76, wherein
among the X first signal(s) and the Y second signal(s), one first signal and one second signal that are associated with each other are located on a single transmit beam.

Embodiment 78

The method according to embodiment 76, wherein
among the X first signal(s) and the Y second signal(s), one first signal and one second signal that are associated with each other are located in a single first time unit.

Embodiment 79

The method according to embodiment 76, wherein for a same cell or super cell,
the first signal is a synchronization signal, and the second signal is a broadcast signal; or
the first signal is a broadcast signal, and the second signal is a synchronization signal; or
the first signal is a synchronization signal, and the second signal is a synchronization signal.

Embodiment 80

The method according to embodiment 79, wherein
the synchronization signal comprises a primary synchronization signal and a secondary synchronization signal; or
the synchronization signal comprises a primary synchronization signal, a secondary synchronization signal, and a third synchronization signal eSSS; and
the primary synchronization signal and the secondary synchronization signal comprised in each synchronization signal are located in a single first time unit.

Embodiment 81

The method according to any one of embodiments 76 to 80, wherein the first time unit is a subframe or a timeslot.

Embodiment 82

The method according to embodiment 79 or 80, wherein for a same cell or super cell,
the first signal is a synchronization signal, and the index of the OFDM symbol in which the first signal is located in the first time unit is indicated by different sequences of the synchronization signal.

Embodiment 83

The method according to embodiment 82, wherein for a same cell or super cell, in a first time unit for transmitting a synchronization signal, sequences of primary synchronization signals in synchronization signals transmitted in different OFDM symbols are used to indicate indexes of corresponding OFDM symbols in the first time unit;

in different first time units for transmitting a synchronization signal, sequences of primary synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Embodiment 84

The method according to embodiment 82, wherein for a same cell or super cell, in a first time unit for transmitting a synchronization signal, sequences of secondary synchronization signals in synchronization signals transmitted in different OFDM symbols are used to indicate indexes of corresponding OFDM symbols in the first time unit;

in different first time units that are used for transmitting a synchronization signal and that are in a same half-frame, sequences of secondary synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Embodiment 85

The method according to embodiment 82, wherein for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same, and sequences of secondary synchronization signals in synchronization signals transmitted in different OFDM symbols are the same;

in different first time units for transmitting a synchronization signal, sequences of primary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Embodiment 86

The method according to embodiment 82, wherein for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of secondary synchronization signals in synchronization signals transmitted in different OFDM symbols are the same; and in different first time units that are used for transmitting a synchronization signal and that are in a same half-frame, sequences of secondary synchronization signals in synchronization signals transmitted in different OFDM symbols are the same.

Embodiment 87

The method according to embodiment 82, wherein for a same cell or super cell, in a first time unit for transmitting a synchronization signal, sequences of third synchronization signals eSSS of synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same; and in different first time units for transmitting a synchronization signal, sequences of primary synchronization signals in synchronization signals transmitted in different OFDM symbols are the same.

Embodiment 88

The method according to embodiment 82, wherein for a same cell or super cell, in a first time unit for transmitting a synchronization signal, sequences of primary synchronization signals in synchronization signals transmitted in different OFDM symbols are used to indicate indexes of corresponding OFDM symbols in the first time unit, and sequences of secondary synchronization signals in synchronization signals transmitted in different OFDM symbols are used to indicate indexes of the first time unit in the second time unit; and in different first time units for transmitting a synchronization signal, sequences of primary synchronization signals in OFDM symbols corresponding to a same OFDM symbol index are the same.

Embodiment 89

The method according to embodiment 82, wherein for a same cell or super cell, in a first time unit for transmitting a synchronization signal, sequences of secondary synchronization signals in synchronization signals transmitted in different OFDM symbols are used to indicate indexes of corresponding OFDM symbols in the first time unit, and sequences of primary synchronization signals in synchronization signals transmitted in different OFDM symbols are used to indicate indexes of the first time unit in the second time unit; and in different first time units that are used for transmitting a synchronization signal and that are in a same half-frame, sequences of secondary synchronization signals in OFDM symbols corresponding to a same OFDM symbol index are the same.

Embodiment 90

The method according to any one of embodiments 83 to 89, wherein for a same cell or super cell, a sequence of the primary synchronization signal in the synchronization signal is used to identify cell ID information in one cell ID group; and a sequence of the secondary synchronization signal in the synchronization signal is used to identify information of a cell ID group.

Embodiment 91

The method according to any one of embodiments 82 to 89, wherein for a same cell or super cell, when the first signal is a synchronization signal and the second signal is a broadcast signal, signaling of the broadcast signal explicitly indicates first-time-unit index information of the broadcast signal; and/or scrambling code in the broadcast signal carries the first-time-unit index information; and/or a mask of cyclic redundancy check code CRC in the broadcast signal carries the first-time-unit index information.

Embodiment 92

The method according to any one of embodiments 82 to 89, wherein for a same cell or super cell, when the first signal is a synchronization signal and the second signal is a broadcast signal, signaling of the broadcast signal explicitly indicates first-time-unit index information of the broadcast signal; and scrambling code in the broadcast signal carries OFDM-symbol index information corresponding to the broadcast signal or OFDM-symbol index information of a synchronization signal corresponding to the broadcast signal.

Embodiment 93

The method according to any one of embodiments 82 to 89, wherein for a same cell or super cell, when the first signal is a synchronization signal and the second signal is a broadcast signal, signaling of the broadcast signal explicitly indicates first-time-unit index information of the broadcast signal; and a mask of CRC in the broadcast signal carries OFDM-symbol index information corresponding to the broadcast signal or OFDM-symbol index information of a synchronization signal corresponding to the broadcast signal.

Embodiment 94

The method according to any one of embodiments 82 to 89, wherein for a same cell or super cell, a maximum quantity of indexes of the first time unit is less than or equal to a quantity of first time units in one second time unit.

Embodiment 95

The method according to any one of embodiments 76 to 94, wherein for a same cell or super cell, a position of a first time unit for sending the first signal by the first network device in one second time unit is changeable.

Embodiment 96

The method according to any one of embodiments 76 to 94, wherein for a same cell or super cell, a position of a first time unit for sending the second signal by the first network device in one second time unit is changeable.

Embodiment 97

The method according to any one of embodiments 76 to 94, wherein for a same cell or super cell, a quantity of first time units occupied by the first network device to send the first signal in one second time unit is changeable.

Embodiment 98

The method according to any one of embodiments 76 to 94, wherein for a same cell or super cell, a quantity of first time units occupied by the first network device to send the second signal in one second time unit is changeable.

Embodiment 99

The method according to any one of embodiments 76 to 98, wherein for a same cell or super cell, a time-frequency resource corresponding to the first signal is associated with a time-frequency resource corresponding to the second signal.

Embodiment 100

The method according to any one of embodiments 76 to 99, wherein for a same cell or super cell, a time-frequency resource corresponding to the first signal and a time-frequency resource corresponding to the second signal are frequency division multiplexed in a same OFDM symbol; or a time-frequency resource corresponding to the first signal and a time-frequency resource corresponding to the second signal are time division multiplexed in different OFDM symbols.

Embodiment 101

A network device, wherein the network device comprises a processor and a memory, the memory stores at least one instruction, at least one program, a code set or an instruction set, and the at least one instruction, the at least one program, the code set or the instruction set is loaded and executed by the processor to implement the signal sending method according to any one of embodiments 51 to 75.

Embodiment 102

A network device, wherein the network device comprises a processor and a memory, the memory stores at least one instruction, at least one program, a code set or an instruction set, and the at least one instruction, the at least one program, the code set or the instruction set is loaded and executed by the processor to implement the signal receiving method according to any one of embodiments 76 to 100.

Embodiment 103

A computer readable storage medium, wherein the storage medium stores at least one instruction, at least one program, a code set or an instruction set, and the at least one instruction, the at least one program, the code set or the instruction set is loaded and executed by a processor to implement the signal sending method according to any one of embodiments 51 to 75.

Embodiment 104

A computer readable storage medium, wherein the storage medium stores at least one instruction, at least one program, a code set or an instruction set, and the at least one instruction, the at least one program, the code set or the instruction set is loaded and executed by a processor to implement the signal receiving method according to any one of embodiments 76 to 100.

The sequence numbers of the foregoing embodiments of this application are merely for an illustrative purpose, and are not intended to indicate priorities of the embodiments.

Persons of ordinary skill in the art may understand that all or a part of the steps in the embodiments may be implemented by hardware, or may be implemented by a program instructing related hardware. The program may be stored in a computer readable storage medium.

The foregoing descriptions are merely examples of embodiments of this application, but are not intended to limit this application. Any modification, equivalent replacement, or improvement made without departing from the spirit and principle of this application shall fall within the protection scope of this application.

What is claimed is:

1. A transceiver for communicating via a network, comprising:
   a memory comprising computer instructions;
   transceiver circuitry for receiving and sending communication signals, wherein the transceiver operates to detect a first signal and a second signal that are sent by a first network device;
   a processor, configured to retrieve and execute the computer instructions to generate an information obtaining unit that is configured to process received communication signals to:
      obtain OFDM-symbol index information, based on the first signal, that indicates an index of an OFDM symbol in which the first signal is located in a first time unit, and
      obtain first-time-unit index information, based on the second signal, that indicates an index of a first time unit in which the second signal is located in a second time unit, wherein the second time unit comprises at least two first time units, and each first time unit comprises at least two OFDM symbols;
   wherein the second signal is a broadcast signal, and signaling of the second signal explicitly indicates first-time-unit index information of the second signal, and scrambling code in the broadcast signal carries OFDM-symbol index information corresponding to the broadcast signal.

2. The apparatus according to claim 1, wherein the first signal is among a plurality of first signals and the second signal is among a plurality of second signals, and a first signal and a second signal that are associated with each other are located on a single transmit beam.

3. The apparatus according to claim 1, wherein the first signal is among a plurality of first signals and the second signal is among a plurality of second signals, and a first signal and a second signal that are associated with each other that are associated with each other are located in a single first time unit.

4. The apparatus according to claim 1, wherein the first signal is a synchronization signal, and the second signal is a broadcast signal.

5. The apparatus according to claim 4, wherein the first signal is a synchronization signal, and the index of the OFDM symbol in which the first signal is located in the first time unit is indicated by different sequences of the synchronization signal.

6. The apparatus according to claim 5, wherein in a first time unit for transmitting a synchronization signal, sequences of third synchronization signals eSSS of synchronization signals transmitted in different OFDM symbols are used to indicate indexes of corresponding OFDM symbols in the first time unit;

in different first time units for transmitting a synchronization signal, sequences of third synchronization signals in OFDM symbols corresponding to a same OFDM symbol index are the same;

in a first time unit for transmitting a synchronization signal, sequences of primary synchronization signals in synchronization signals transmitted in different OFDM symbols are the same, and sequences of secondary synchronization signals in synchronization signals transmitted in different OFDM symbols are the same;

in different first time units for transmitting a synchronization signal, sequences of primary synchronization signals in synchronization signals transmitted in different OFDM symbols are the same; and in different first time units that are used for transmitting a synchronization signal and that are in a same halfframe, sequences of secondary synchronization signals in synchronization signals transmitted in different OFDM symbols are the same.

7. The apparatus according to claim 1, wherein the first time unit is four OFDM symbols, and the second time unit comprises at least eight OFDM symbols.

8. The apparatus according to claim 7, wherein the first signal is on the first OFDM symbol of the first time unit.

9. A method for signal receiving, wherein the method comprises:
    detecting, by a second network device, a first signal and a second signal that are sent by a first network device; and
    obtaining, by the second network device, OFDM-symbol index information, based on the first signal, that indicates an index of an OFDM symbol in which the first signal is located in a first time unit, and
    obtaining first-time-unit index information, based on the second signal, hat indicates an index of a first time unit in which the second signal is located in a second time unit, wherein the second time unit comprises at least two first time units, and each first time unit comprises at least two OFDM symbols;
    wherein the second signal is a broadcast signal, and signaling of the second signal explicitly indicates first-time-unit index information of the second signal, and scrambling code in the broadcast signal carries OFDM-symbol index information corresponding to the broadcast signal.

10. The method according to claim 9, wherein
the first signal is among a plurality of first signals and the second signal is among a plurality of second signals, and a first signal and a second signal that are associated with each other are located on a single transmit beam.

11. The method according to claim 9, wherein
the first signal is among a plurality of first signals and the second signal is among a plurality of second signals, and a first signal and a second signal that are associated with each other are located in a single first time unit.

12. The method according to claim 9, wherein for a cell or super cell,
    the first signal is a synchronization signal, and the second signal is a broadcast signal.

13. The method according to claim 12, wherein the first signal is a synchronization signal, and the index of the OFDM symbol in which the first signal is located in the first time unit is indicated by different sequences of the synchronization signal.

14. The method according to claim 13, wherein in a first time unit for transmitting a synchronization signal, sequences of third synchronization signals eSSS of synchronization signals transmitted in different OFDM symbols are used to indicate indexes of corresponding OFDM symbols in the first time unit;
    in different first time units for transmitting a synchronization signal, sequences of third synchronization signals in OFDM symbols corresponding to a same OFDM symbol index are the same;
    in a first time unit for transmitting a synchronization signal, sequences of primary synchronization signals in synchronization signals transmitted in different OFDM symbols are the same, and sequences of secondary synchronization signals in synchronization signals transmitted in different OFDM symbols are the same;
    in different first time units for transmitting a synchronization signal, sequences of primary synchronization signals in synchronization signals transmitted in different OFDM symbols are the same; and
    in different first time units that are used for transmitting a synchronization signal and that are in a same halfframe, sequences of secondary synchronization signals in synchronization signals transmitted in different OFDM symbols are the same.

15. The method according to claim 13, wherein when the first signal is a synchronization signal and the second signal is a broadcast signal,
    signaling of the broadcast signal explicitly indicates first-time-unit index information of the broadcast signal; and
    a mask of CRC in the broadcast signal carries OFDM-symbol index information corresponding to the broadcast signal or OFDM-symbol index information of a synchronization signal corresponding to the broadcast signal.

16. The method according to claim 9, wherein the first time unit is four OFDM symbols, and the second time unit comprises at least eight OFDM symbols.

17. The method according to claim 16, wherein the first signal is on the first OFDM symbol of the first time unit.

18. An apparatus, comprising:
    a memory that includes computer instructions;
    a processor coupled to the memory, that executes the computer instructions to perform the steps of:
    detecting a first signal and a second signal that are sent by a first network device; and
    obtaining OFDM-symbol index information based on the first signal, and obtaining first-time-unit index information based on the second signal, wherein the OFDM-symbol index information indicates an index of an OFDM symbol in which the first signal is located in a first time unit, the first-time-unit index information indicates an index of a first time unit in which the second signal is located in a second time unit, one second time unit comprises at least two first time units, and each first time unit comprises at least two OFDM symbols
    wherein the second signal is a broadcast signal, and signaling of the second signal explicitly indicates first-time-unit index information of the second signal, and scrambling code in the broadcast signal carries OFDM-symbol index information corresponding to the broadcast signal.

19. A computer-readable storage medium having instruction stored thereon that, when executed by a processor, causes an apparatus to perform the steps of:
    detecting a first signal and a second signal that are sent by a first network device; and
    obtaining OFDM-symbol index information based on the first signal, and obtaining first-time- unit index information based on the second signal, wherein the OFDM-symbol index information indicates an index of an OFDM symbol in which the first signal is located in a first time unit, the first-time-unit index information indicates an index of a first time unit in which the second signal is located in a second time unit, one second time unit comprises at least two first time units, and each first time unit comprises at least two OFDM symbols;
    wherein the second signal is a broadcast signal, and signaling of the second signal explicitly indicates first-time-unit index information of the second signal, and scrambling code in the broadcast signal carries OFDM-symbol index information corresponding to the broadcast signal.

\* \* \* \* \*